(12) United States Patent
Peck et al.

(10) Patent No.: US 9,625,114 B2
(45) Date of Patent: Apr. 18, 2017

(54) LED REFLECTOR OPTIC FOR AN AUTOMOTIVE HEADLIGHT

(71) Applicant: Dialight Corporation, Farmingdale, NJ (US)

(72) Inventors: John Patrick Peck, Brielle, NJ (US); Cecil D. Thomas, Matawan, NJ (US); Francisco J. Natividad, East Brunswick, NJ (US)

(73) Assignee: Dialight Corporation, Farmingdale, NJ (US)

(*) Notice: Subject to any disclaimer, the term of this patent is extended or adjusted under 35 U.S.C. 154(b) by 0 days.

(21) Appl. No.: 15/339,401

(22) Filed: Oct. 31, 2016

(65) Prior Publication Data
US 2017/0045193 A1    Feb. 16, 2017

Related U.S. Application Data

(63) Continuation of application No. 14/507,565, filed on Oct. 6, 2014, now Pat. No. 9,482,404, which is a continuation of application No. 13/111,030, filed on May 19, 2011, now Pat. No. 8,851,723.

(51) Int. Cl.
| | |
|---|---|
| *F21V 7/00* | (2006.01) |
| *B60Q 1/06* | (2006.01) |
| *F21S 8/10* | (2006.01) |
| *F21V 29/74* | (2015.01) |

(52) U.S. Cl.
CPC ....... *F21S 48/1388* (2013.01); *F21S 48/1159* (2013.01); *F21S 48/1317* (2013.01); *F21S 48/1747* (2013.01); *F21S 48/328* (2013.01); *F21S 48/34* (2013.01); *F21V 29/74* (2015.01)

(58) Field of Classification Search
CPC .... F21S 48/1388; F21S 48/1159; F21S 48/14; F21S 48/1747; F21S 48/34; B60C 1/06
See application file for complete search history.

(56) References Cited

U.S. PATENT DOCUMENTS

| | | | |
|---|---|---|---|
| 2,568,494 | A | 9/1951 | Geissbuhler |
| 5,430,623 | A | 7/1995 | Uchida |
| 6,471,383 | B1 | 10/2002 | Oyama et al. |
| 7,261,439 | B2 | 8/2007 | Sormani |

(Continued)

OTHER PUBLICATIONS

"Important Communication" for International Application No. PCT/US2012/038171, mailed Aug. 7, 2013, consists of 8 unnumbered pages.

(Continued)

*Primary Examiner* — Joseph L Williams

(57) ABSTRACT

The automotive headlight includes one or more first light emitting diodes (LEDs) and one or more second LEDs, wherein the one or more second LEDs are positioned at about 180 degrees with respect to the one or more first LEDs, wherein the headlight optical axis is about −90 degrees with respect to a LED optical axis of the one or more first LEDs, at least one first reflector, wherein the at least one first reflector redirects light from the one or more first LEDs to an angle of about −90 degrees with respect to a LED optical axis of the one or more first LEDs and at least one second reflector, wherein the at least one second reflector redirects light from the one or more second LEDs to an angle of about −90 degrees with respect to the LED optical axis of the one or more first LEDs.

20 Claims, 19 Drawing Sheets

(56) References Cited

U.S. PATENT DOCUMENTS

| | | |
|---|---|---|
| 7,306,352 B2 | 12/2007 | Sokolov et al. |
| 7,690,826 B2 | 4/2010 | Kim |
| 7,794,128 B2 | 9/2010 | Fujiwara et al. |
| 7,824,076 B2 | 11/2010 | Koester |
| 7,922,377 B2 | 4/2011 | Yamamichi et al. |
| 2006/0291226 A1 | 12/2006 | Daicho et al. |
| 2007/0211473 A1 | 9/2007 | Peck |
| 2007/0236953 A1 | 10/2007 | Nakazawa et al. |
| 2008/0253142 A1 | 10/2008 | Nakada |
| 2009/0073706 A1 | 3/2009 | Tatara et al. |
| 2009/0097247 A1 | 4/2009 | Tseng et al. |
| 2010/0194276 A1 | 8/2010 | Okubo et al. |
| 2011/0002133 A1 | 1/2011 | Albou et al. |
| 2011/0170306 A1 | 7/2011 | Yatsuda et al. |
| 2011/0280028 A1 | 11/2011 | Uchida |
| 2012/0140498 A1 | 6/2012 | Fabbri et al. |
| 2012/0201043 A1 | 8/2012 | Dipenti et al. |

OTHER PUBLICATIONS

International Search Report and Written Opinion for PCT/US2012/038171, Aug. 17, 2012, copy consists of 13 pages.

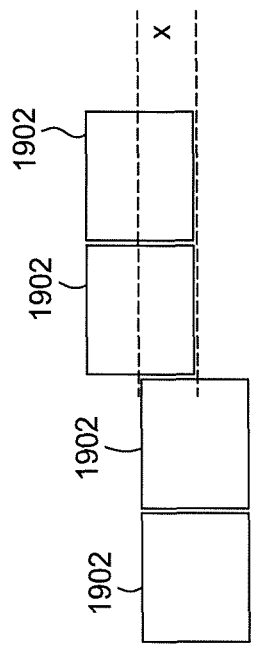
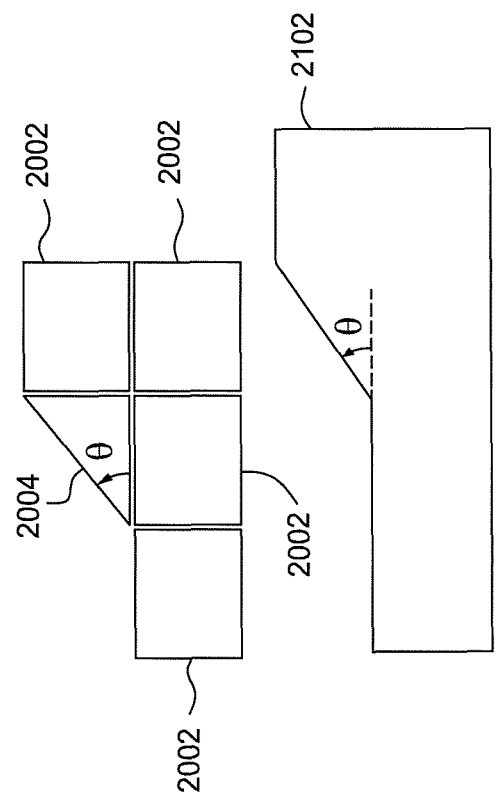
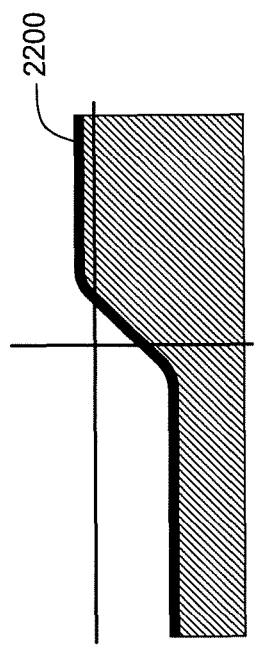
FIG. 19   FIG. 20   FIG. 21   FIG. 22

US 9,625,114 B2

LED REFLECTOR OPTIC FOR AN AUTOMOTIVE HEADLIGHT

CROSS-REFERENCE TO RELATED APPLICATIONS

This application is a continuation of U.S. patent application Ser. No. 14/507,565, filed Oct. 6, 2014, now U.S. Pat. No. 9,482,404, which is a continuation of U.S. patent application Ser. No. 13/111,030, filed May 19, 2011, now U.S. Pat. No. 8,851,723, all of which are herein incorporated by reference in their entirety.

FIELD OF THE INVENTION

The present disclosure is directed to an automotive headlight, for example a light emitting diode (LED) reflector optic for headlights used for forward lighting on vehicles.

BACKGROUND OF THE INVENTION

Automotive headlights typically have a low beam and a high beam. Low beam may also be known as dipped beam, passing beam, or meeting beam. Low beam headlamps provide a distribution of light designed to provide adequate forward and lateral illumination with limits on light directed towards the eyes of other road users, to control glare. This beam is intended for use when other vehicles are present ahead. The international ECE Regulations for filament headlamps and for high-intensity discharge headlamps specify a beam with a sharp, asymmetric cutoff preventing significant amounts of light from being cast into the eyes of drivers of preceding or oncoming cars. Control of glare is less strict in the North American SAE beam standard contained in FMVSS/CMVSS 108. High beam may also be known as main beam, driving beam, or full beam. High beam headlamps provide a bright, center-weighted distribution of light with no particular control of light directed towards other road users' eyes. As such, they are only suitable for use when alone on the road, as the glare they produce will distract other drivers. International ECE Regulations permit higher-intensity high-beam headlamps than are allowed under North American regulations. FIG. 11 shows an illustration of low beam light pattern on the ground whereas FIG. 12 shows an illustration of high beam light pattern on the ground.

The majority of today's automotive headlights use traditional light sources such as tungsten-halogen or xenon bulbs. These light sources are not as efficient as some current lighting technologies. Automotive headlights using traditional light sources, such as tungsten-halogen or xenon also suffer from short life and susceptibility to damage and failure from shock and vibration.

Furthermore, most light sources emit light in a spherical pattern. As a result, previous headlight designs created the sharp beam cutoff by projecting the image of a mechanical shutter. This method of using a mechanical shutter to block light results in wasted light since the mechanical shutter absorbs or reflects light.

SUMMARY OF THE INVENTION

The present disclosure relates generally to an automotive headlight. In one embodiment, the automotive headlight comprises one or more first light emitting diodes (LEDs), one or more second LEDs, wherein the one or more second LEDs are positioned at about 180 degrees with respect to the one or more first LEDs, wherein the headlight optical axis is about −90 degrees with respect to an LED optical axis of the one or more first LEDs, at least one first reflector, wherein the at least one first reflector redirects light from the one or more first LEDs to an angle of about −90 degrees with respect to an LED optical axis of the one or more first LEDs and at least one second reflector, wherein the at least one second reflector redirects light from the one or more second LEDs to an angle of about −90 degrees with respect to the LED optical axis of the one or more first LEDs.

In one embodiment, the present disclosure provides an LED assembly for an automotive headlight. The LED assembly comprises one or more LEDs, wherein a headlight optical axis is between −70 and −110 degrees with respect to an LED optical axis of the one or more LEDs, wherein a peak intensity of the one or more LEDs is directed in an upward direction with respect to a ground surface and at least one reflector, wherein the at least one reflector redirects light from the one or more LEDs to an angle between −70 and −110 degrees with respect to an LED optical axis of the one or more LEDs.

In one embodiment, the present disclosure provides an LED assembly for an LED automotive headlight. The LED assembly comprises one or more first LEDs, wherein a headlight optical axis is between −70 and −110 degrees with respect to an LED optical axis of the one or more first LEDs, wherein a peak intensity of the one or more first LEDs is directed in a downward direction with respect to a ground surface, at least one first reflector, wherein the at least one first reflector redirects light from the one or more LEDs to an angle between −70 and −110 degrees with respect to an LED optical axis of the one or more first LEDs and one or more second LEDs positioned above the one or more first LEDs, wherein light originating from the one or more second LEDs exits the automotive headlight within +/−20 degrees to the headlight optical axis.

BRIEF DESCRIPTION OF THE DRAWINGS

So that the manner in which the above recited features of the present invention can be understood in detail, a more particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 19 depicts one embodiment of an arrangement of LED dice;

FIG. 20 depicts another embodiment of an arrangement of LED dice;

FIG. 21 depicts one embodiment of an LED die; and

FIG. 22 depicts an example of a low beam cutoff.

DETAILED DESCRIPTION

As discussed previously, the majority of today's automotive headlights use traditional light sources such as tungsten-halogen or xenon bulbs. These light sources are not as efficient as newer technologies such as LEDs. Automotive headlights using traditional light sources, such as tungsten-halogen or xenon also suffer from short life and susceptibility to damage and failure from shock and vibration. Light emitting diodes (LEDs) can have much longer life than traditional light sources and are extremely robust due to their solid-state construction. This makes LEDs a good choice for use in automotive headlights.

LEDs may not have as high source luminance as traditional light sources like tungsten-halogen or high intensity discharge lamps. As a result, larger light source areas (multi-die LEDs) may be needed in order to provide the source etendue requirements needed to create the beam patterns expected on high-end vehicles. For examples, high-end automobile makers demand headlights with high peak light intensities commonly referred to as hot-spots, sharp low-beam cutoffs, and more ground illumination in front and to the sides of the vehicle.

Other applications for headlights, such as those used by the military, have additional photometric requirements. For example, military personnel may prefer to have more ground illumination than what is provided by ordinary headlights. This can be used to more easily detect dangers such as IEDs (improvised explosive devices).

Traditional optical designs such as a light cover, a reflector, or projector optics, when used with a large LED die area, may not provide the required high-end optical performance when space limitations exist. For example, headlamps such as the 7-inch round, 90-mm round, or 4×6-inch rectangular have very limited room in the enclosure for the LEDs, optics, power supplies, heat sinks, and other components. Furthermore, the use of a mechanical shutter with projection lens results in objectionable color variations throughout the beam due to chromatic aberration caused by dispersion of the lens material. Color fringing is also caused by diffraction of light at the sharp edge of the shutter placed at or near the focal length of the projection lens in HID systems or directly on top of the die in projection lens based LED headlights. These chromatic aberrations can cause objectionable color variations or color fringing across the beam pattern.

Figure 10:
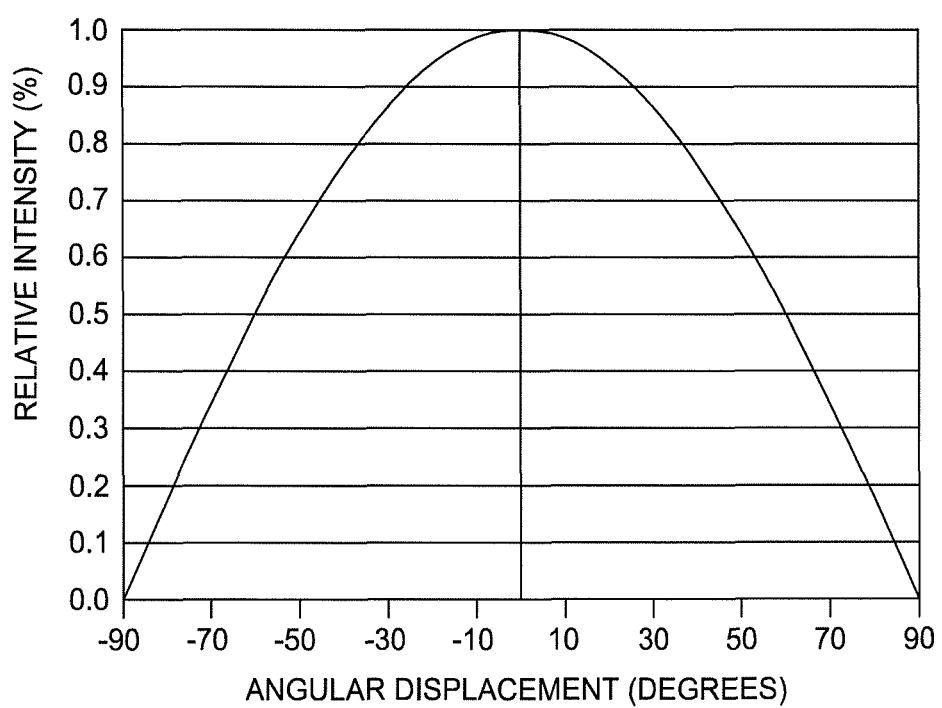
FIG. 10 depicts a graph depicting a representation of relative light intensity versus angular displacement for light typically emitted from an LED.
Figure 11:
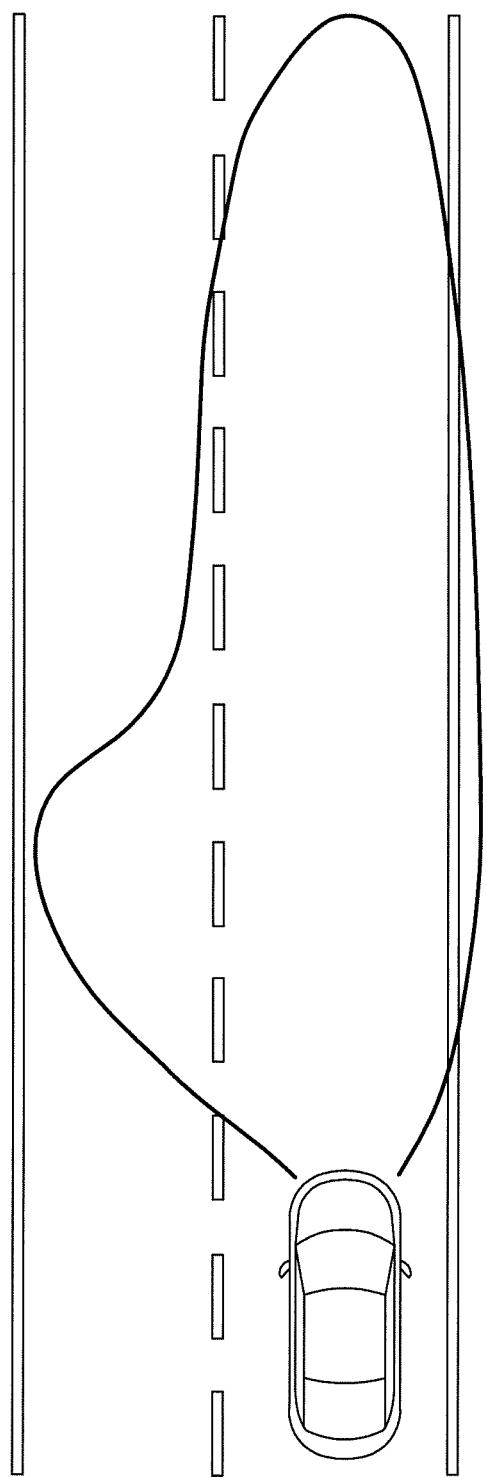
FIG. 11 depicts an example of an automotive low beam light pattern on the ground.
Figure 12:
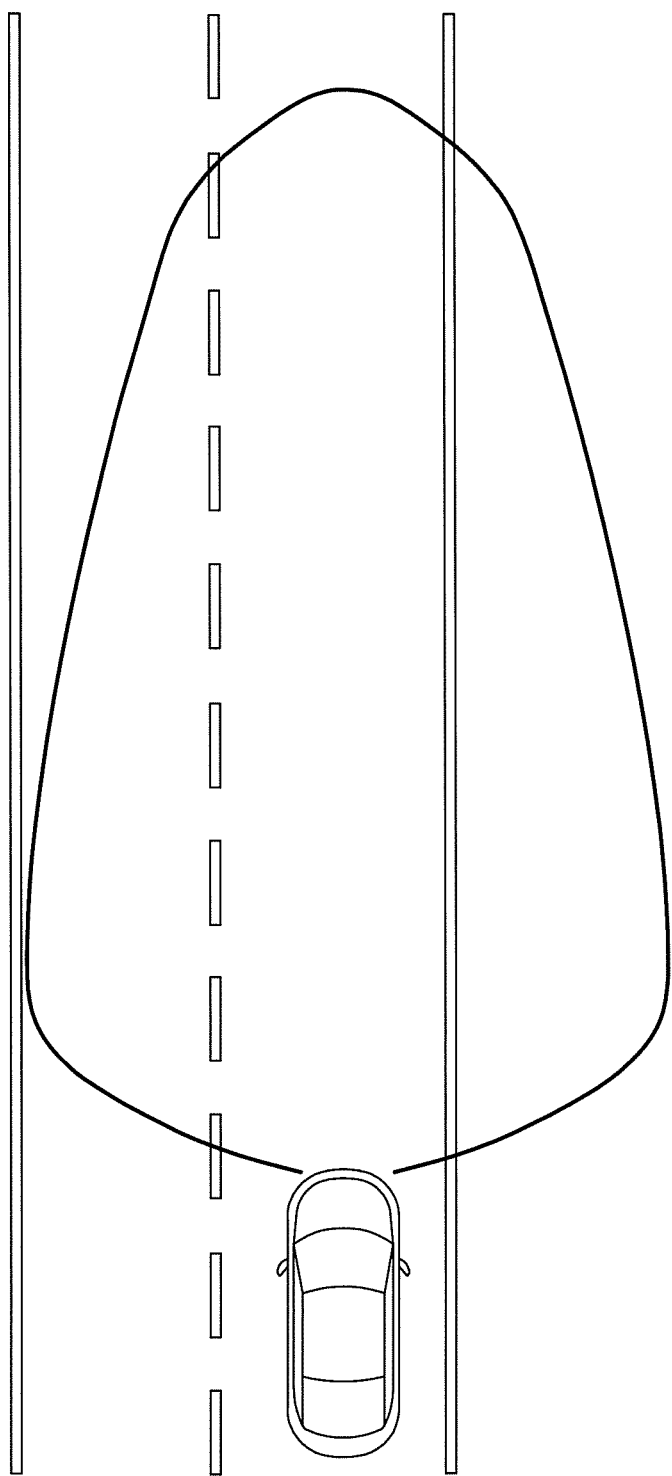
FIG. 12 depicts an example of an automotive high beam light pattern on the ground.

Furthermore, most light sources emit light in a spherical pattern. This typically requires a combination of optics such as reflectors and lenses to capture and utilize a high percentage of the light. LEDs are unique in that they emit light in an approximately hemispherical pattern due to the reflective elements on the back side of the LED die. For example, light is emitted from approximately −90 to +90 degrees in one axis as shown in FIG. 10. Therefore, light covers, lenses, or projector optics are typically placed directly forward of an LED. This results in a large optic that cannot create a sharp beam cutoff without losing significant optical flux. For example, previous headlight designs created the sharp beam cutoff by projecting the image of a mechanical shutter. The mechanical shutter may be placed in front of the LED or on top of the LED because most high power automotive LEDs do not have domes in order to achieve high luminance values. This method of using a mechanical shutter to block light results in much wasted light since the mechanical shutter absorbs or reflects light.

Figure 1:
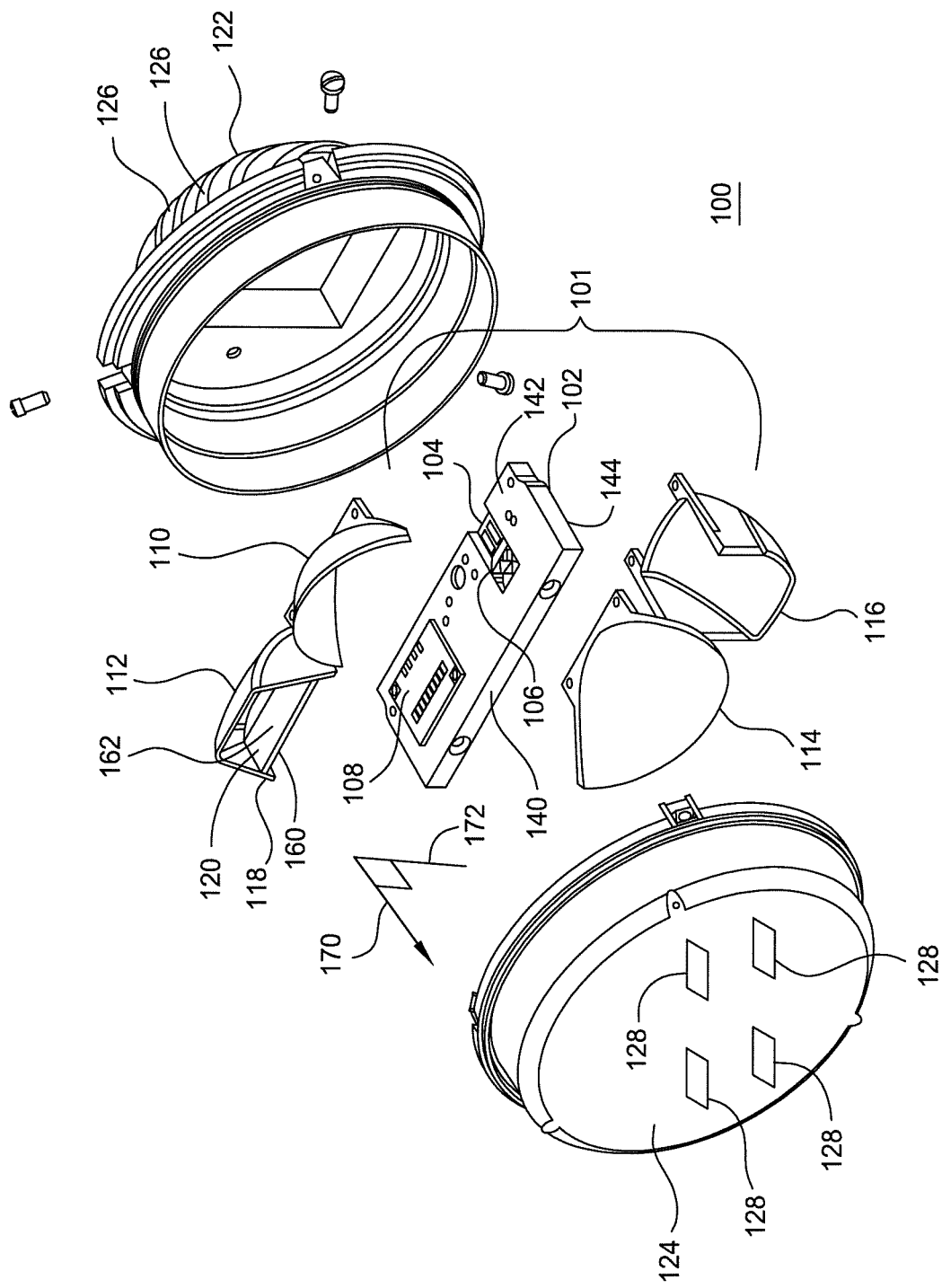
FIG. 1 depicts a top exploded isometric view of one embodiment of an automotive headlight.
Figure 2:
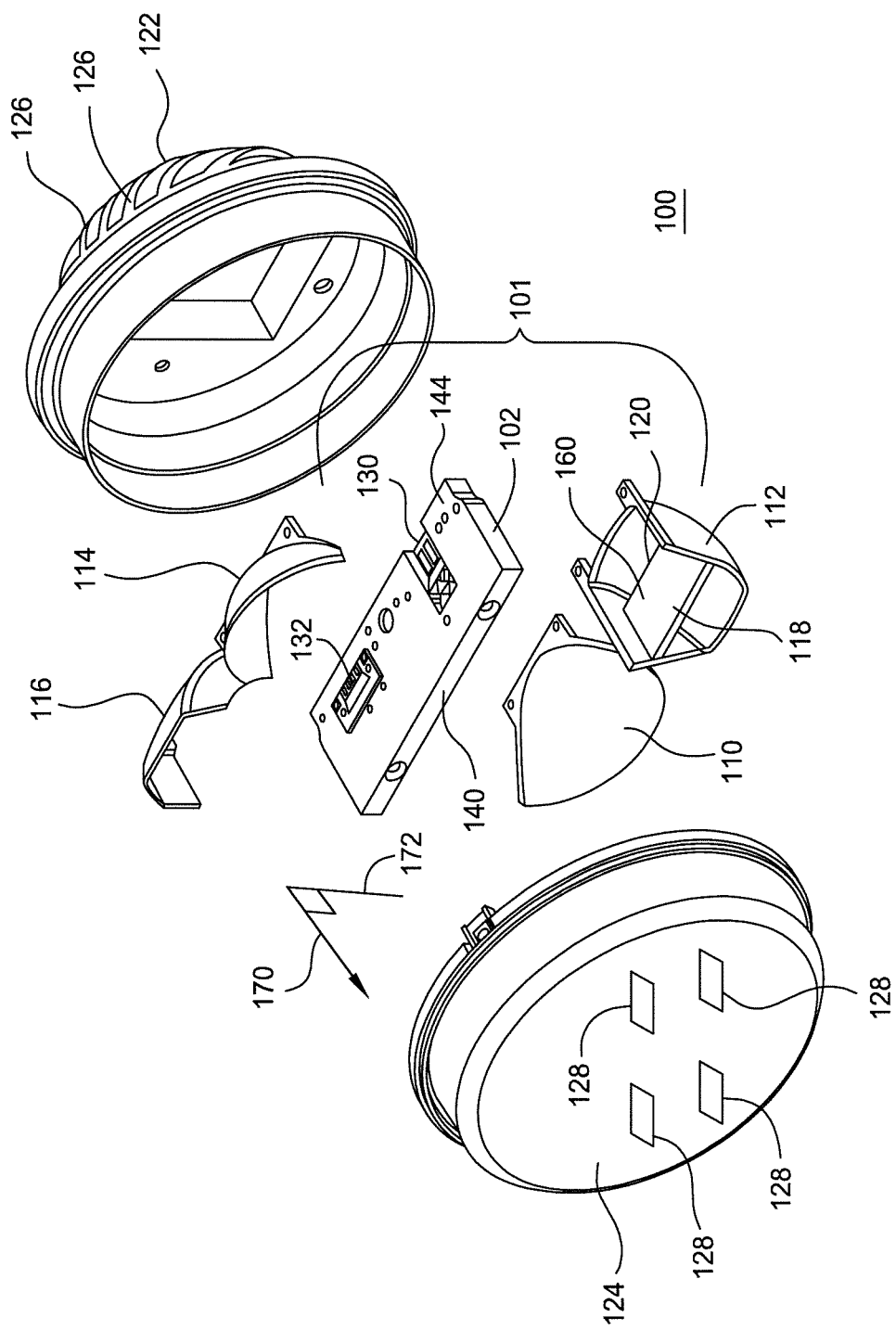
FIG. 2 depicts a bottom exploded isometric view of one embodiment of an automotive headlight.

Therefore, novel and new optical designs with high coupling efficiencies are needed in order to reduce size and allow LEDs to be successful in the automotive headlight market. FIG. 1 illustrates a top exploded isometric view and FIG. 2 illustrates a bottom exploded isometric view of one embodiment of an automotive headlight 100 that addresses the needs discussed above. The automotive headlight 100 includes a light emitting diode (LED) assembly 101. In one embodiment, the LED assembly 101 includes a support plate 102. The support plate 102 may be fabricated from a conductive metal such as, for example, aluminum or copper. As a result, the support plate 102 may serve as a heat spreader to dissipate heat, as will be discussed in further detail below, as well as a mechanical support for one or more LEDs.

The support plate 102 may include a front edge 140, a top side 142 and a bottom side 144. In one embodiment, "front" may be defined as a direction in which light is emitted out of the automotive headlight 100, "top" may be defined as a direction in which light is emitted upward and "bottom" may be defined as a direction in which light is emitted downward. The use of "front," "top," and "bottom" are used herein as respective references to the orientation of the automotive headlight 100 on a vehicle but there may be uses of the present disclosure where the automotive headlight may be used in different orientations. The term "up" and "down" may be used with respect to the ground. More specifically, the term "up" may be used to describe a vector that is normal to the ground and away from the ground. More specifically, the term "down" may be used to describe a vector that is normal to the ground and pointing toward the ground. A normal is a vector that is perpendicular to a surface such as the ground surface. In one embodiment, normal may be defined as a constituent being at +/−90 degrees with respect to a plane.

The support plate 102 may be used to support one or more LEDs 106 and 108 on the top side 142 of the support plate, as illustrated in FIG. 1. The support plate 102 may also be used to support one or more LEDs 130 and 132 on the bottom side 144, as illustrated in FIG. 2. In one embodiment, there may be more than one support plate to mount one or more LEDs.

In one embodiment, there may be an LED optical axis 172 associated with one or more of the LEDs. It should be noted that although only a single LED optical axis 172 is illustrated in FIG. 1, that there may be multiple LED optical axes. For example, each one of the one or more LEDs 106, 108, 130 and 132 may be associated with an LED optical axis 172. In addition, if there is more than one LED optical axis 172, each one of the LED optical axes may be positioned at different angles with respect to each other.

In one embodiment, some of the LEDs may be positioned on a same side with respect to other LEDs. For example, the same side may be defined as being positioned approximately 0 degrees with respect to other LEDs. For example, the LED optical axis 172 of the one or more LEDs 108 may be positioned at about 0 degree with respect to the LED optical axis 172 of the one or more LEDs 106. In one embodiment, the 0 degree has a tolerance of +/−20 degrees.

In one embodiment, some of the LEDs may be positioned on an opposing side with respect to other LEDs. For example, the opposing side may be defined as being positioned at about 180 degrees with respect to other LEDs. For example, the LED optical axis 172 of the one or more LEDs 108 may be positioned at about 180 degrees with respect to the LED optical axis 172 of the one or more LEDs 130. In one embodiment, the 180 degrees has a tolerance of +/−20 degrees.

Figure 3:
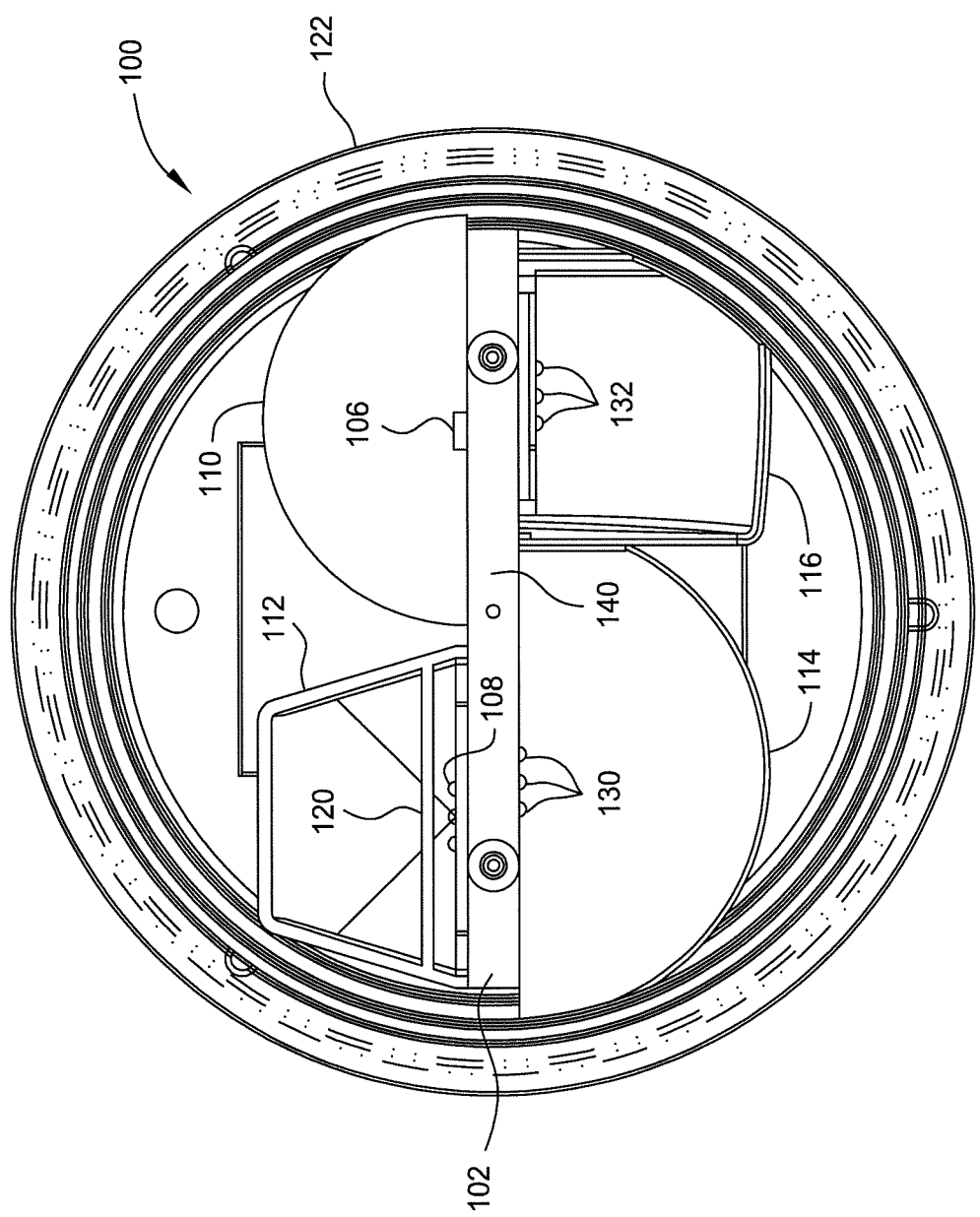
FIG. 3 depicts a front view of one embodiment of the automotive headlight.

As shown in FIG. 3, one or more first LEDs may be mounted on approximately the same plane as one or more second LEDs. For example, the one or more LEDs 108 may be mounted on approximately the same plane as the one or more LEDs 106. In other words, the one or more LEDs 108 may be mounted on the same side of the support plate 102 and next to the one or more LEDs 106. In one embodiment, the one or more LEDs 130 may be mounted on the same side of the support plate 102 and next to the one or more LEDs 132

Two reflectors may be mounted next to each other and approximately on the same plane. For example, reflector 112 and reflector 110 may be mounted next to each other and approximately on the same plane. Two reflectors may be mounted approximately opposite each other. That is to say that two reflectors may be mounted approximately 180 degrees from each other. For example, reflector 112 and reflector 114 may be mounted approximately 180 degrees from each other. The reflectors described herein may have smooth continuous reflector surfaces or may have facets, breaks, or combinations of curvatures in various portions of the reflector surfaces.

In one embodiment, light emitted from the LEDs may pass through an interface. For example, the interface may be air, a solid gel or a plastic within the automotive headlight 100.

The one or more LEDs 106 or 108 may be pointed in an upward direction. In other words, the light from the one or more LEDs 106 or 108 may be emitted in a direction of the LED optical axis 172 that is approximately perpendicular or normal with respect to a headlight optical axis 170, as illustrated in FIG. 1. In one embodiment, perpendicular may be defined as one constituent being at +/−90 degrees with respect to another constituent. In one embodiment, the LED optical axis 172 may be approximately −90 degrees with respect to the headlight optical axis 170. However, if the orientation is in the opposite direction, the LED optical axis 172 may be approximately +90 degrees with respect to the headlight optical axis 170. The +/−90 degrees may have a tolerance of +/−20 degrees. In one embodiment, the direction of the peak intensity of light emitted by the one or more LEDs may be represented by a vector. The vector may be perpendicular to the headlight optical axis. For example, a first vector representing a first one or more LEDs may point away from the ground. A second vector representing a second one or more LEDs may point toward the ground.

The headlight optical axis 170 may be defined herein as the direction in which the highest concentration of light is emitted from the automotive headlight 100. In other words, the headlight optical axis 170 is the direction in which the peak light intensity is emitted from the automotive headlight 100. The LED optical axis 172 may be defined herein as the direction in which the highest concentration of light is emitted out of the LED. In other words, the LED optical axis 172 is the direction in which the peak light intensity is emitted out of the LED.

In one embodiment, the one or more LEDs 130 or 132 are pointed in a downward direction. In other words, the light from the one or more LEDs 130 or 132 are emitted in a direction of the LED optical axis 172 that is approximately perpendicular or normal with respect to the headlight optical axis 170. In one embodiment, perpendicular may be defined as one constituent being at +/−90 degrees with respect to another constituent. In one embodiment, the LED optical axis 172 may be approximately −90 degrees with respect to the headlight optical axis 170. However, if an LED orientation is in an opposite direction, the LED optical axis 172 may be approximately +90 degrees with respect to the headlight optical axis 170. The +/−90 degrees may have a tolerance of +/−20 degrees.

The automotive headlight 100 may include a low-beam function as well as a high beam function. The light pattern of the low beam normally has a cutoff so as to reduce headlight glare for vehicles forward of the automotive headlight 100.

In one embodiment, at least some of the LEDs used during the low-beam mode may also be used during the high-beam mode. The high beam may require significantly more light than the low beam and therefore may generate excess heat. In one embodiment, the LED used in the low beam may also be used in the high beam but the current to the LEDs used in the low beam may be reduced during the high-beam function. In one embodiment, the current supplied to one or more LEDs is at least 10% lower in the high-beam function than the low-beam function.

In one embodiment, the one or more LEDs 108 may comprise a plurality of LEDs. Some of the LEDs 108 may be low beam LEDs capable of producing up to 10-30 watts (W) of light. Some of the LEDs 108 may be high beam LEDs capable of producing up to 20-40 W of light. In other words, the one or more LEDs 108 may include both low beam and high beam LEDs.

In one embodiment, the one or more LEDs 106 may include a high beam LED. For example, the one or more LEDs 106 may be an LED capable of producing up to 20-40 W of light.

In one embodiment, the one or more LEDs 106 may be placed in a recess 104 of the support plate 102. As a result, the light emitted at certain angles around −90 degrees with respect to the LED optical axis 172 from the one or more LEDs 106 will be blocked and will not contribute to headlight glare for vehicles forward of the automotive headlight 100. In one embodiment, the one or more LEDs 130 may be placed in a recess of the support plate 102.

The one or more LEDs 108 may be coupled to a circuit board such that they are flush with the support plate 102. Locating one or more LEDs approximately flush with the support plate 102 may help in blocking light at certain angles and therefore help create a sharp cutoff on the low beam for example. In other words the LED die may be located at, slightly above or below the same plane as the top side 142 of the support plate 102. In one embodiment, the circuit board may be a metal core board in order to efficiently move heat away from the one or more LEDs 108.

In one embodiment, the one or more LEDs 130 may include a plurality of LEDs. The one or more LEDs 130 includes low beam LEDs. For example, the one or more LEDs 130 are LEDs capable of producing up to 10-30 W of light.

The reflector 114 may be coupled to the bottom side 144 of the support plate 102 to redirect light emitted from the one or more LEDs 130. In one embodiment, the reflector 114 is designed to prevent light from being spread in the horizontal direction and provide collimation of light in both the horizontal and the vertical direction. For example, the reflector 114 may have a curved shape that is concave.

In one embodiment, the one or more LEDs 132 may include a plurality of LEDs. The one or more LEDs 132 includes low beam LEDs. For example, the one or more LEDs 132 are LEDs capable of producing up to 10-30 W of light.

The reflector 116 may be coupled to the bottom side 144 of the support plate 102 to redirect light emitted from the one or more LEDs 130. In one embodiment, the reflector 116 is designed to redirect light more in the horizontal direction than the vertical direction.

Some of the reflectors may be designed to substantially collimate light in both the vertical and horizontal direction, such as the reflectors 110 and 114. For example, the reflectors 110 and 114 may have a curved shape that is concave in two axes. In one embodiment, the reflector 114 is shaped so as to redirect the LED light and create a vertical beam spread of between 4-6 degrees and a horizontal beam spreads of between 2-4 degrees.

Some of the reflectors may be designed to collimate light in the vertical axis much more substantially than the horizontal axis, such as the reflectors 112 and 116. In other words, the light is reflected forward in the horizontal axis and has a wide beam spread in the horizontal axis compared to the vertical axis. In one embodiment, the reflector 116 is shaped so as to redirect the LED light forward and create a vertical beam spread of between 3-15 degrees and a horizontal beam spread of between 30-50 degrees.

Some of the reflectors may be designed to also reflect light in an upward and downward vertical direction, as well as reflect light to create a wide beam spread in the horizontal axis, such as the reflector 112. For example, the reflector 112 may have a complimentary reflector 120 that is positioned within the interior volume or inside of the reflector 112. The interior volume may refer to the air space bounded by the reflector surfaces and side walls. In one embodiment, the interior volume may be a solid such as plastic. In one embodiment, the complimentary reflector 120 may be positioned substantially within the interior volume or inside of the reflector 112. In one embodiment, the complimentary reflector 120 is substantially flat and has an average radius of curvature that is at least ten times the average radius of curvature of reflector 112. The average radius of curvature applies to the reflector surface areas that substantially contribute to useful light forward of the vehicle. In one embodiment the complimentary reflector functions using total internal reflection (TIR). The average radius of curvature may be found by averaging the distances from the center of the DICE of the one or more LEDs to uniformly spaced points across the entire reflector surface projected onto a plane. For example, the average radius of curvature along a horizontal axis may be determined by averaging the distances to points on the reflector surface projected onto a horizontal plane that contains the headlight optical axis. The average radius of curvature along a vertical axis may be determined by averaging the distances to points on the reflector surface projected onto a vertical plane that contains the headlight optical axis.

The complimentary reflector 120 may be located above the plane on which the one or more LEDs 108 are located. The complimentary reflector 120 may block or reflect a portion of light emitted by the one or more LEDs 108.

In one embodiment, the light distribution out of the automotive headlight 100 may be changed by adjusting the position of the complimentary reflector 120 at some time during the manufacturing process of the automotive headlight 100. In one embodiment, the manufacturing process may refer to the assembling process. In one embodiment, the complimentary reflector 120 may be moveably coupled to the reflector 112 via one or more slots 118 of reflector 112. In one embodiment, the slots 118 are located in the sidewalls of the reflector 112. This allows the complimentary reflector 120 to be adjusted to allow light from the one or more LEDs 108 to be reflected at a range of desired angles. For example, during assembly of the automotive headlight 100, the complimentary reflector 120 may be moved in or moved out along the slots 118 to properly align the complimentary reflector 120 relative to the one or more LEDs 108. In addition, the complimentary reflector 120 may be tilted with respect to the reflector 112 at an angle, either upwards or downwards, depending on the desired application. In one embodiment, the range of angles that the complimentary reflector 120 may be tilted is between 5 and −5 degrees with respect to the horizontal axis. In one embodiment, the complimentary reflector 120 may also be mounted on the support plate 102 independently with or without contact with reflector 112 but still coupled to its interior volume.

In one embodiment, a bottom side 160 of the complimentary reflector 120 as shown in FIG. 2, may be used to reflect the light emitted from the one or more LEDs 108 in a downward direction. In other words, a bottom side 160 of the complimentary reflector 120 as shown in FIG. 2, may be used to reflect the light emitted from the one or more LEDs 108 below a horizontal plane containing the headlight optical axis 170. For example, the light reflected below the plane containing the headlight optical axis 170 may provide more light onto the ground or street. In addition, a top side 162 of the complimentary reflector 120 may be metalized or mirrored to reflect some of the light emitted from the one or more LEDs 108 in an upward vertical direction. For example, this provides some light upwards to read signage that is above the vehicle driver. A more detailed diagram of how the light is reflected off of the complimentary reflector 120 is illustrated in FIG. 4 and discussed below in further detail.

Figure 4:
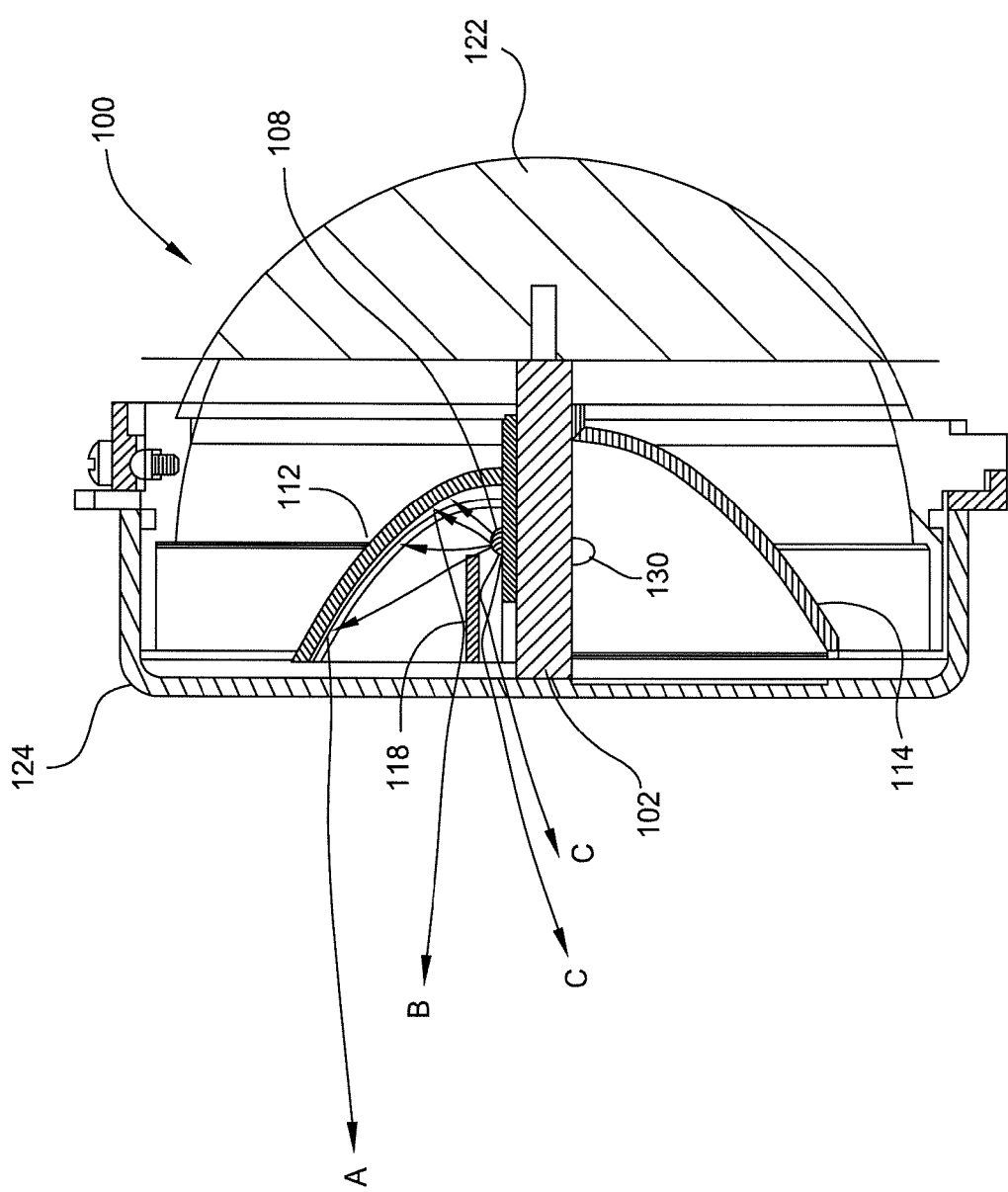
FIG. 4 depicts a side cut-away view of one embodiment of the automotive headlight.

FIG. 4 shows a cross-sectional side view of one embodiment of an automotive headlight 100. FIG. 4 also illustrates a more detailed diagram of the reflector 112 and the complimentary reflector 120. As shown, the reflector 112 may be positioned so that a reflecting surface of reflector 112 intersects light emitted by the one or more LEDs 108 generally along the LED optical axis of the one or more LEDs 108. In other words, the reflector 112 may be positioned relative to the one or more LEDs 108 so that the peak intensity of light emitted from the one or more LEDs 108 is reflected by the reflector 112. In one embodiment, the reflector 112 may be positioned relative to the one or more LEDs 108 so that light emitted from the one or more LEDs 108 between the angles of +20 degrees and −20 degrees with respect to the LED optical axis is reflected by the reflector 112. FIG. 4 also shows that the reflector 114 may be positioned so that a reflecting surface of reflector 114 intersects light emitted by the one or more LEDs 130 generally along the LED optical axis of the one or more LEDs 130. In one embodiment, the reflector 114 may be positioned relative to the one or more LEDs 130 so that light emitted from the one or more LEDs 130 between the angles of +20 degrees and −20 degrees with respect to the LED optical axis is reflected by the reflector 114.

The automotive headlight 100 also includes a light cover 124 and a housing 122. The light cover 124 may be plastic or glass. In one embodiment, the light cover 124 may include one or more optical features 128 as shown in FIGS. 1 and 2. The optical features 128 may be designed to redirect light in any desired direction or pattern from the LEDs. For example, the optical features 128 may refract the light so that a beam spread increases in a horizontal axis more than a vertical axis.

In one embodiment, there may be one or more optical features 128 for each one of the one or more LEDs 106 and 108, for example, on the top side of the support plate 102 and each one of the one or more LEDs on the bottom side of the support plate 102 (shown in FIG. 2). The optical features 128 may be refractive. In one embodiment, the optical features 128 may consist of one or more individual lenses or other individual optical elements. The optical features 128 may consist of individual planar features, such as prisms or may be curved lenses. Prisms will act to refract the light at specific angles, whereas small arrays of lenses may act to spread the light. The lenses may be cylindrical or may be round. Cylindrical lenses can spread the light in one axis whereas round lenses may spread the light in all directions. In one embodiment, the one or more optical features 128 refract light from the one or more LEDs 108 to a more downward direction. In other words, at least some light emitted by the one or more LEDs 108 between an angle of −75 and −90 degrees is refracted to a more negative angle with respect to the optical axis of the one or more LEDs 108.

In one embodiment, the light cover 124 may be coupled to the housing 122 to enclose the LED lighting assembly 101. The LED lighting assembly 101 may be enclosed such that the front edge 140 of the support plate 102 contacts an interior side of the light cover 124. As a result, the support plate 102 may be used as an efficient thermal path between the LEDs and the light cover 124. Therefore, the support plate 102 helps to remove moisture, e.g., snow and ice, on the exterior of the light cover 124. For example, heat generated from operation of the LEDs may be transferred to the support plate 102, which may be then transferred from the support plate 102 to the light cover 124. In one embodiment, an additional heat spreader, e.g., graphite, may be applied between the front edge 140 of the support plate 102 and the interior side of the light cover 124.

Figure 18:
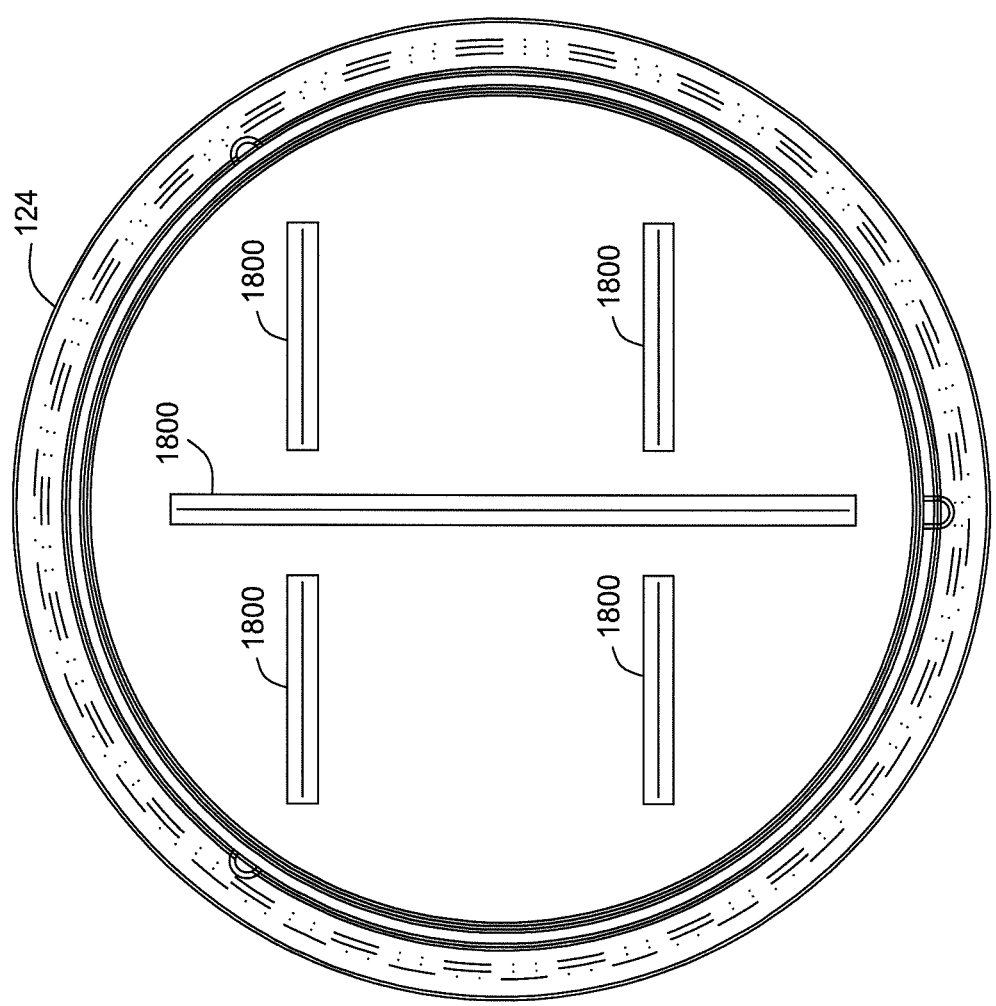
FIG. 18 depicts a front view of one embodiment of a heater of the automotive headlight.

In a further embodiment, a heater may be used to help melt snow and ice that may be on the light cover 124. FIG. 18 shows several heaters or heater strips 1800 coupled to the light cover 124. The heaters 1800 may consist of a heater element, a plastic material, and an adhesive. In one embodiment, a transparent plastic material is used that transmits at least 50% of visible light. The adhesive may be used to attach the heater element to the light cover. In one embodiment, the heaters 1800 are shaped like a rectangular strip. In other words, the one or more heaters 1800 are substantially longer than they are wide. In one embodiment, one or more heater strips 1800 are positioned at approximately the center of the lens 124 and oriented approximately vertically as shown in FIG. 18. In one embodiment, one or more heater strips 1800 are positioned at approximately the center of the lens 124 and oriented approximately horizontally as shown in FIG. 18.

A control circuit may be used to turn the heater on and off at desired temperatures. For example, the heater may turn on at temperatures below 10 degrees Celsius but may turn off at temperatures below −10 degrees Celsius. The heater may also turn off when the temperature of the automotive headlight or light cover 124 has risen to a specified temperature point. In one embodiment, heater may turn on at temperatures below 10 degrees Celsius but may turn off at temperatures above −5 degrees Celsius. In one embodiment, the temperature at which the heater is turned on or off is determined by measuring some point inside the automotive headlight 100. In one embodiment, the temperature at which the heater is turned on or off is determined by measuring some point outside the automotive headlight 100.

In one embodiment, additional support plates may be placed inside the automotive headlight 100. For example, one or more additional support plates (with or without additional LEDs) may be placed above and/or below the support plate 102. The additional support plates may be used to create additional thermal paths between the headlight housing and the light cover 124 for dissipating heat away from the LEDs and may be used to melt snow or ice that may accumulate on the cover lens during cold climates. In one embodiment, one or more LEDs may be mounted to a first support plate and one or more second LEDs may be mounted to a second support plate. In one embodiment, the additional support plate would be connected to the housing 122 and heat would transfer from the support plate 102 to the housing 122, to the additional support plates, and then to the light cover 124.

The housing 122 may be designed to include heat sink fins 126. The heat sink fins 126 help to dissipate heat away from the LED lighting assembly 101 to ensure efficient operation of the LEDs.

One advantage of the present design is that both the high beam and the low beam functionality is included in a single housing. That is, separate housings are not required to provide a low beam headlight and a high beam headlight.

In addition, almost all of the light emitted from the LEDs are utilized by the present design. That is, almost no light is wasted by blocking the light to control the beam spread as done in previous headlamp designs. The low beam cut-off is created using a complex shaped reflector surface which projects an image of the edge of the LED die without the aid of a light blocking mechanism. Below the projected edge is the hot-spot which may be used to aim the headlight in the proper direction.

FIG. 3 illustrates a front view of one embodiment of the automotive headlight 100. FIG. 3 illustrates the one or more LEDs 130 and 132 on the bottom side 144 of the support plate 102, as discussed above.

FIG. 4 illustrates a side cut-away view of one embodiment of the automotive headlight 100. As discussed above, FIG. 4 illustrates how the support plate 102 contacts the light cover 124. Heat may be transferred from the support plate 102 to the light cover 124 to remove moisture, e.g., snow and ice, on the exterior of the light cover.

FIG. 4 also illustrates in further detail how light emitted from the one or more LEDs 108 may be redirected by reflector 112 and the complimentary reflector 120. In one embodiment, the reflector 112 includes a first side and a second side and a curved portion coupled to the first side and the second side creating an interior volume. The first side and the second side may each have a slot 118 for movably coupling the complimentary reflector 120 to the reflector 112 in the interior volume. For example, a position of the complimentary reflector 120 may be adjusted. For example, the position may include moving in or moving out the complimentary reflector 120 via the slots 118 or tilting or angling the complimentary reflector 120 via the slots 118 to a desired angular range. For example, the tilt can be approximately 1 degree to 5 degrees. In one embodiment, the complimentary reflector 120 may be adjusted during a manufacturing process of the automotive headlight 100.

The specific sizes, shapes, locations, and arrangements of the reflectors with respect to each other and with respect to the LEDs described here are important factors for creating a desired optical pattern. The light emitted by the LED and redirected by the reflectors 112 and 120 can be described in the zones A, B, and C as shown in FIG. 4.

Figure 5:
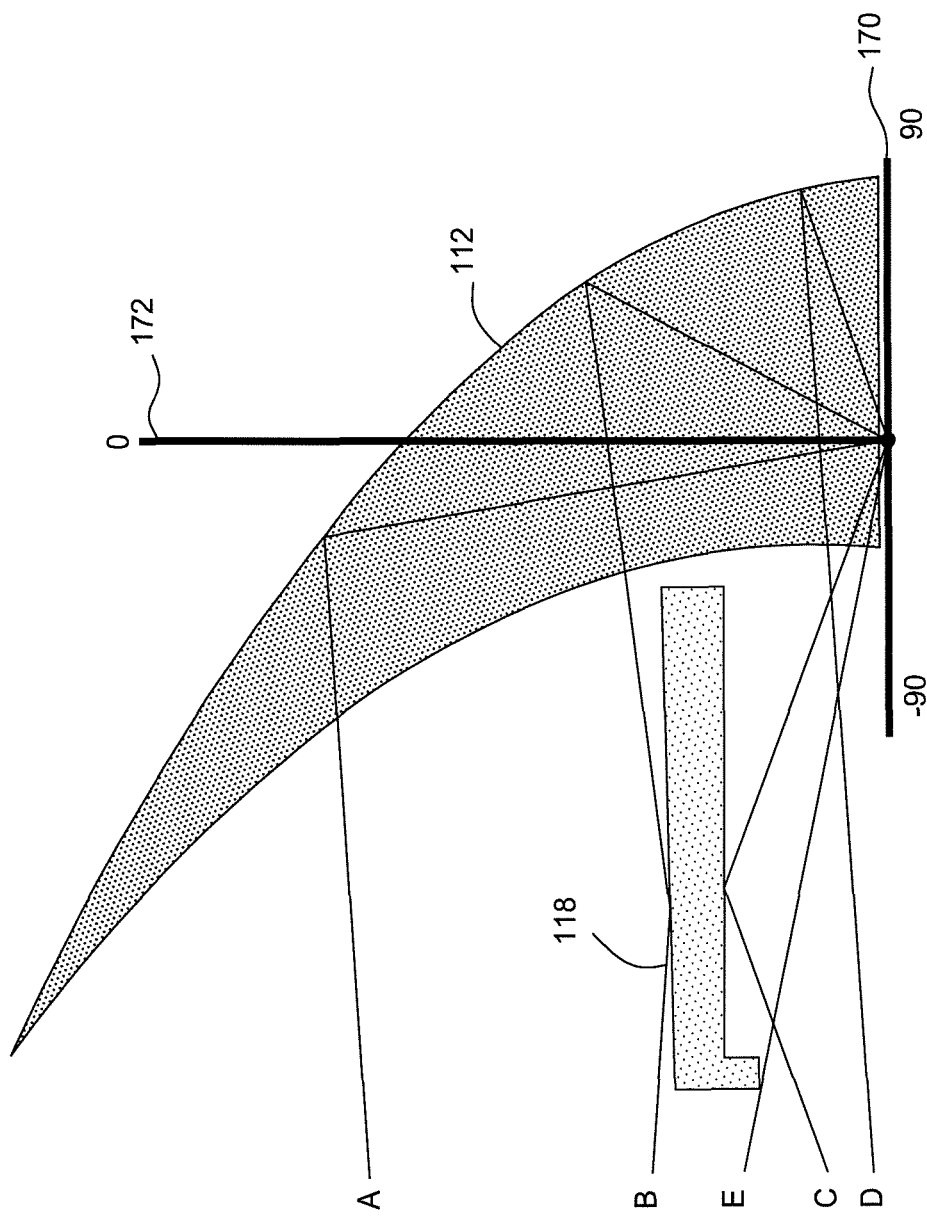
FIG. 5 depicts the reflection of the light rays.
Figure 6:
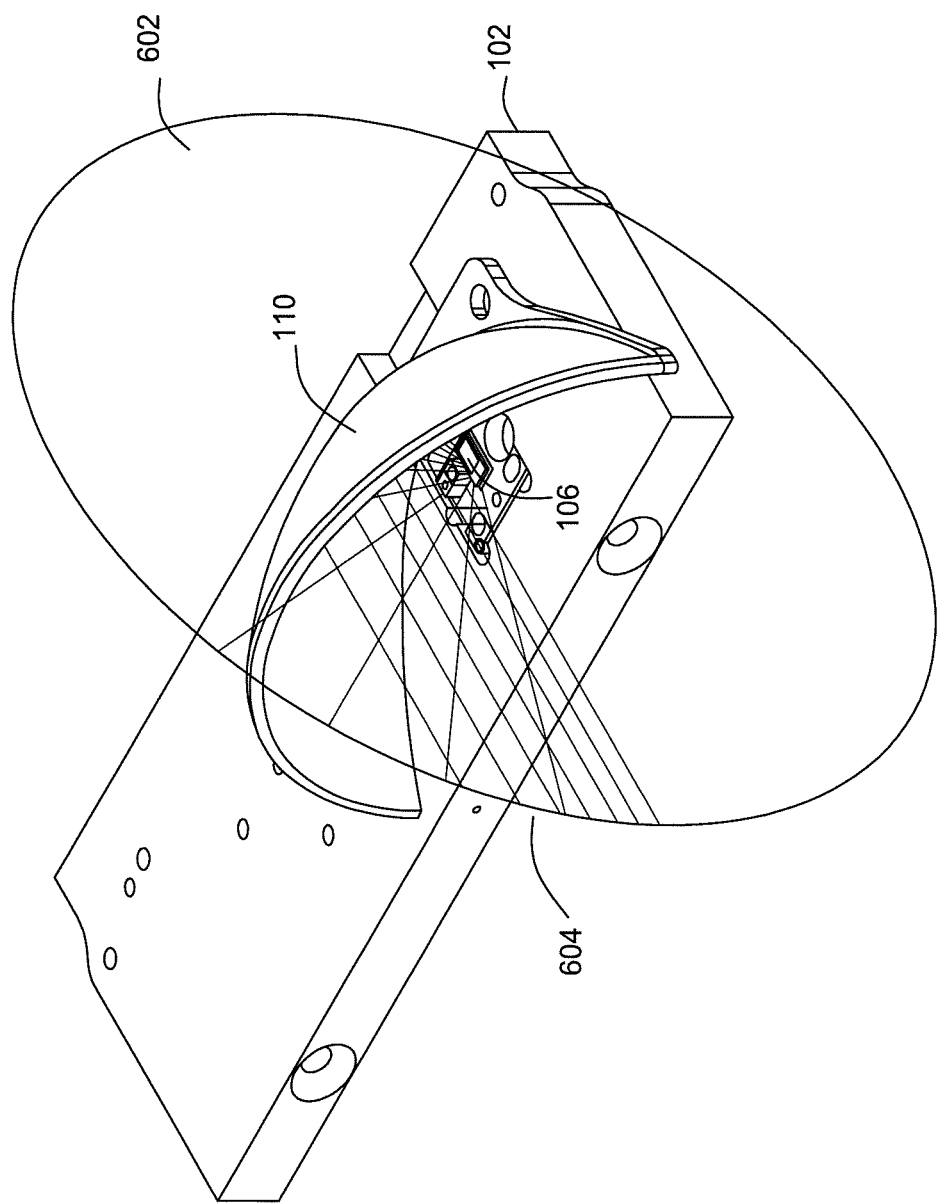
FIG. 6 depicts a plane of the light rays.

FIG. 5 shows an illustration of the light rays redirected by reflectors 112 and 120 with more detailed discussion about various zones of the light rays. FIG. 5 shows an illustration of a reflector 112 and a complimentary reflector 120. The reflector 112 is placed with respect to the LED optical axis 172 and the headlight optical axis 170 The angles discussed below in the various zones may pertain to the light rays contained in plane 602 illustrated in FIG. 6. FIG. 6 helps to illustrate the light rays 604 that are contained within a plane 602. The angles discussed below may also be applied to other planes parallel to the vertical plane that contains the headlight optical axis in proximity to the one or more reflectors.

Referring back to FIG. 5, zone A represents light that may be directed down-the-road and provides wide view illumination without causing glare to oncoming traffic. In one embodiment, at least some light emitted by the LED between the angles 15 and −45 degrees is redirected by the reflector 112 so that some light is directed to angles between −90 and −105 degrees with respect to the LED optical axis 172. The reflector 112 may have a substantially higher average radius of curvature in the horizontal axis than the vertical axis allowing the light to spread more in the horizontal axis than the vertical axis. In one embodiment, the average radius of curvature in the horizontal axis is at least five times greater than the average radius of curvature in the vertical axis. In one embodiment, the reflector 112 reflects light from the one or more LEDs 108 so that the beam spread for zone A is between 20 and 40 degrees in the horizontal axis. In one embodiment, reflector 112 reflects light from the one or more LEDs 108 so that the beam spread in the horizontal axis is at least 1.5 times the beam spread in the vertical axis.

Reflector 114 may contribute more light to the hot-spot than reflector 112. Accordingly, reflector 114 may provide more collimation in the horizontal axis than reflector 112. In one embodiment, a portion of reflector 114 has an average radius of curvature in a first axis that is not more than five times greater the average radius of curvature in a second axis.

Zone B represents light that may be directed upward to illuminate sign boards and other roadside warning signs. In one embodiment, at least some light emitted by the one or more LEDs 108 between the angles of 30 and 15 degrees is redirected by the reflector 112 to angles between −82 and −90 degrees with respect to the LED optical axis 172.

Figure 7:
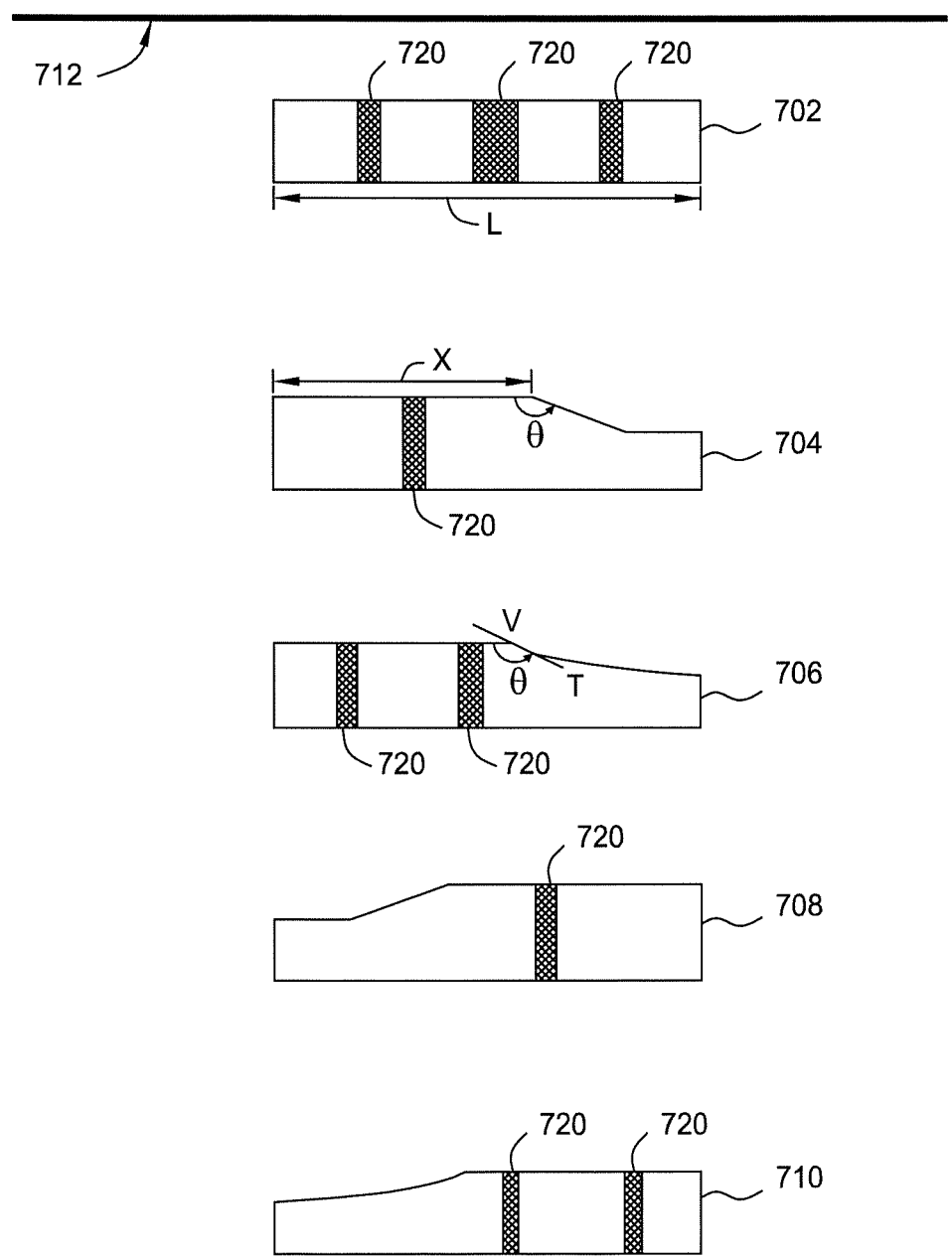
FIG. 7 depicts one embodiment of selective metallization and geometries of a complimentary reflector.

In a further embodiment, the top side 162 of the complimentary reflector 120 may be selectively metalized to reflect light. The areas of the complimentary reflector 120 and the amount of metallization may be a function of the desired amount of up-light that is desired for a particular application. FIG. 7 shows this in detail.

In FIG. 7, metalized areas are shown as dark bands 720. The areas of metallization can be oriented differently to vary the beam spread in the vertical axis. The bands can also be used to limit or expand the angular range of the reflected light upwards in order to aid the driver in reading overhead signage. For example, 4 degrees upwards in the vertical and 8 degrees to the left in the horizontal direction is specified by Federal Motor Vehicle Safety Standards (FMVSS). The shape, location, orientation and size of the areas of metallization can be varied to adjust the primary direction and the angular spread of the diffusion as demanded by the application. In other words, the targeted angular zone could be at a different angular location and also wider or narrower for a non-automotive application.

Zone C represents light that may be directed more downward and thus contributing towards foreground illumination. In one embodiment, at least some light emitted by the one or more LEDs 108 between the angles of −45 and −75 degrees is redirected by the complimentary reflector 120 to angles between −135 and −165 degrees with respect to the LED optical axis 172.

In a further embodiment, the bottom side 160 of the complimentary reflector 120 may be selectively metalized to reflect light. The areas of the complimentary reflector 120 and the amount of metallization may be a function of the desired amount of up-light that is desired for a particular application. The principles and applications discussed above on selective metallization apply here as well, the only difference being the light reflected off surface 160 is directed towards the ground and contributes to the driver's road vision.

The top side 162 or the bottom side 160 may be substantially flat or may have some curvature. In one embodiment the average radius of curvature of the top side 162 is at least five times greater than the average radius of curvature in a vertical axis of reflector 112. In one embodiment the average radius of curvature of the bottom side 160 is at least five times greater than the average radius of curvature in the vertical axis of reflector 112.

In a further embodiment, the top side 162 of the complimentary reflector 120 may be selectively metalized to reflect light. The areas of the complimentary reflector 120 and the amount of metallization may be a function of the desired amount of up-light that is desired for a particular application.

Zone D represents light that may be directed down-the-road for wide view illumination without causing glare to oncoming traffic. In one embodiment, at least some light emitted by the one or more LEDs 108 between the angles of 90 and 30 degrees is redirected by the complimentary reflector 120 to angles between −90 and −105 degrees with respect to the LED optical axis 172.

Zone E may represent light that is directed upward to provide critical illumination for sign boards and other roadside warning signs. In one embodiment, at least some light emitted by the one or more LEDs 108 between the angles of −75 and −90 degrees with respect to the LED optical axis 172 is not redirected by the complimentary reflector 120.

The horizontal spread for zone A may be 30 degrees, 12 degrees for zone B and 45 degrees for zone C. Beam spread may be defined herein as the angle between the two directions in a plane in which the intensity is equal to 50% of the maximum intensity in the beam. In one embodiment, the reflector curvature is shaped such that the beam spread in a first zone is at least two times the beam spread in a second zone. In one embodiment, the reflector curvature is shaped such that the beam spread in a third zone is at least three times the beam spread in a second zone. In one embodiment, the horizontal beam spread has a tolerance of +/−5 degrees.

In another embodiment, the LED dice may be positioned in a closely spaced array. The LED die array may be located on individual mounts and packages; the LED die array may be located on a single package. For example, the LED may be an array of 1×2, 1×3, 1×4, 2×2 dice on a single package. For example, the 1×2 array may be positioned so that the two dice are perpendicular to the forward beam of light. Similarly, the 1×4 array may be positioned so that the four dice are perpendicular to the headlight optical axis 170 of light. On the other hand, a 1×2 or 1×4 array may be placed parallel to the direction of the headlight optical axis 170 for the high beam configuration where a cutoff is not important.

LEDs may be preferred for light sources in automotive forward lighting applications as they offer significant benefits in reliability, power consumption and styling. An LED dice array or a single large die may be shaped and oriented such that any beam pattern can be created by simply projecting the image of the dice array or large die using a relatively simple reflector and/or lens system, in the desired direction. A dice array may be accurately positioned and/or shaped like the dipped beam pattern 2200 shown in FIG. 22 so that a simple magnified image of the array formed at the right location in front of the vehicle will create a low beam pattern without the use of mechanical or optical devices that block or filter out a portion of the emitted light from the LED in order to create the sharp beam cut-off required for example on a low beam automotive headlight. One embodiment of the aforementioned method is shown in FIGS. 19-21. FIG. 22 shows a typical automotive low beam pattern 2200 with the angled cut-off. Beam cut-off is vital to preventing glare to oncoming traffic and vehicles in front of the vehicle on which the headlight is mounted.

FIGS. 19-21 depict top views of how this may be accomplished. One or more square dice 1902 may be used as depicted in FIG. 19 offset from each other with respect to the LED optical axis in order to target the low beam pattern shown in FIG. 22. The positional offset between the dice 1902 is used to create the slope and cut-off in the beam pattern shown in FIG. 22. Here, the separation between dice 1902 has to be between one hundredth to one tenth the width of an individual die in order to avoid projecting the gap between the dice forward of the vehicle as this will lead to one or more dark bands depending on how many dice are used. It must be noted that anywhere between one large die to 8 separate dice can be used per LED depending on the amount of light required to create the target beam pattern. The offset distance x can vary from one tenth of the width of a die to 1.5 times the width of a die. The smaller of the two dimensions is used to calculate the offset in the case of a rectangular die.

FIG. 20 shows how dice can be cut in different shapes and then imaged forward to form the desired pattern. One die 2004 is cut in a triangular shape to form the cut-off and hot-spot when projected forward of the vehicle. Angle θ is translated to the slope of the beam cut-off and can vary between 15 degrees to 60 degrees. The other dice 2002 positioned around the triangular die 2004 contribute to both the hot-spot and also provide wide angle illumination. Here too, the separation between dice has to be between one hundredth to one tenth the width of an individual die in order to avoid projecting the gap between the dice forward of the vehicle as this will lead to one or more dark bands depending on how many dice are used.

A single large die 2102 cut to the required shape may also be used to create the desired beam pattern as depicted in FIG. 21. The size and shape of the source whether it is a multi-die or single large die will determine the size, shape and complexity of the optic that will be used to project the image of the source forward of the vehicle.

In a further embodiment, the complimentary reflector 120 may have a tailored shape or tailored geometries and, thus, create unique beam shaping by blocking or reflecting light from the LED at angles suitable to the application. In one embodiment, the tailored shape helps create the cut-off on the low beam. For example, the complimentary reflector 120 geometry may have cutouts with various shapes and angles as shown in FIG. 7.

Referring back to FIG. 7, FIG. 7 illustrates a top view of a further embodiment of the complimentary reflector 120. The total width of the reflector 702 denoted by L can be anywhere between a tenth of an inch to over ten inches. The point at which the linear or curved cut-out intersects the edge facing the cover lens is denoted by distance x where x can vary from zero to L. In the case of a curved cut-out, a vertex V is also defined as shown by a reflector 706. It must be noted that the cut-outs can be placed anywhere in the complimentary reflector in order to optimize the beam shape. The cut-outs as shown in the reflectors 704 and 706 can be further defined by the slope for a linear cut-out or slope of the tangent that contains vertex V for a curved cut-out, represented by angle θ. The angle θ can vary between zero degrees to 270 degrees.

The reflectors 704 and 710 also illustrate the selective metallization concept, as discussed above, as well as the concept of tailoring geometry to create beam cut-offs. The reflectors 704 or 706, for example, shows geometry that may be used to create a beam pattern similar to a Visual Optical Right (VOR) pattern as specified in the United States under FMVSS chapter 108 or an elbow pattern as specified by European (ECE) regulations for right-hand traffic.

The reflectors 708 or 710 show geometry that may be used to meet head-lighting regulations specified for Visual Optical Left (VOL) patterns or ECE regulations for left-hand traffic. It should be noted that the slope of the linear cut out in the reflector 704 and the reflector 708 or the slope of the tangent to the curved section shown in the reflector 706 or the reflector 710 can be significantly altered to change the shape and sharpness of the beam cut-off. The cut-outs may be moved within reflector 120 in order to optimize the performance and manufacturability of the reflector.

In a further embodiment, the complimentary reflector 120 may have a portion that drops down to block or reflect light. This mechanism may be used to control the amount of light reflected upwards. The portion may be slotted so that if the reflection in the vertical direction exceeds what is prescribed by regulations due to manufacturing tolerances on the various reflecting surfaces, it may be moved vertically to partially or completely block light from LEDs 108 in zone E.

The LEDs create significant heat and therefore the LEDs with the highest heat density may be placed diagonally opposite from each other. In other words, they may be placed further from each other on the support plate 102 instead of on top of each other. For example the LEDs on the concentrating reflectors used to create the low beam and high beam hot spots may be placed diagonally from each other.

Reflector side walls may be used especially on reflectors where the average radius of curvature in the horizontal axis is significantly different than the curvature in the vertical axis on the reflectors. In one embodiment, the reflector sidewalls limit the beam spread in the horizontal axis. The sidewalls may be substantially flat or have some limited curvature. Certain portions of the reflector side walls may have a texture to diffuse or scatter the light in order to minimize glare.

LEDs may be placed in a line for a single common reflector such as reflector 112 and reflector 116. In one embodiment, the LEDs may be placed along a curve, staggered, or in a saw tooth pattern. The straight or large average radius of curvature allows for multiple LEDs to be used as well as allowing for a wider beam spread in one axis. Some LEDs may be offset from other LEDs to concentrate light at different angles. For example, the low beam LEDs may concentrate light at a different angle than the high beam LEDs. This may allow the high beam LEDs to contribute light above the low beam cutoff. Certain LEDs may be driven at different currents in different modes. For example, LEDs used in the low beam may also be used in the high beam but at a different drive current. LEDs in the low beam may be used at a lower or higher drive current than when used in the low beam mode. In one embodiment, the low beam LED current is reduced by between 10 and 50 percent.

Figure 8:
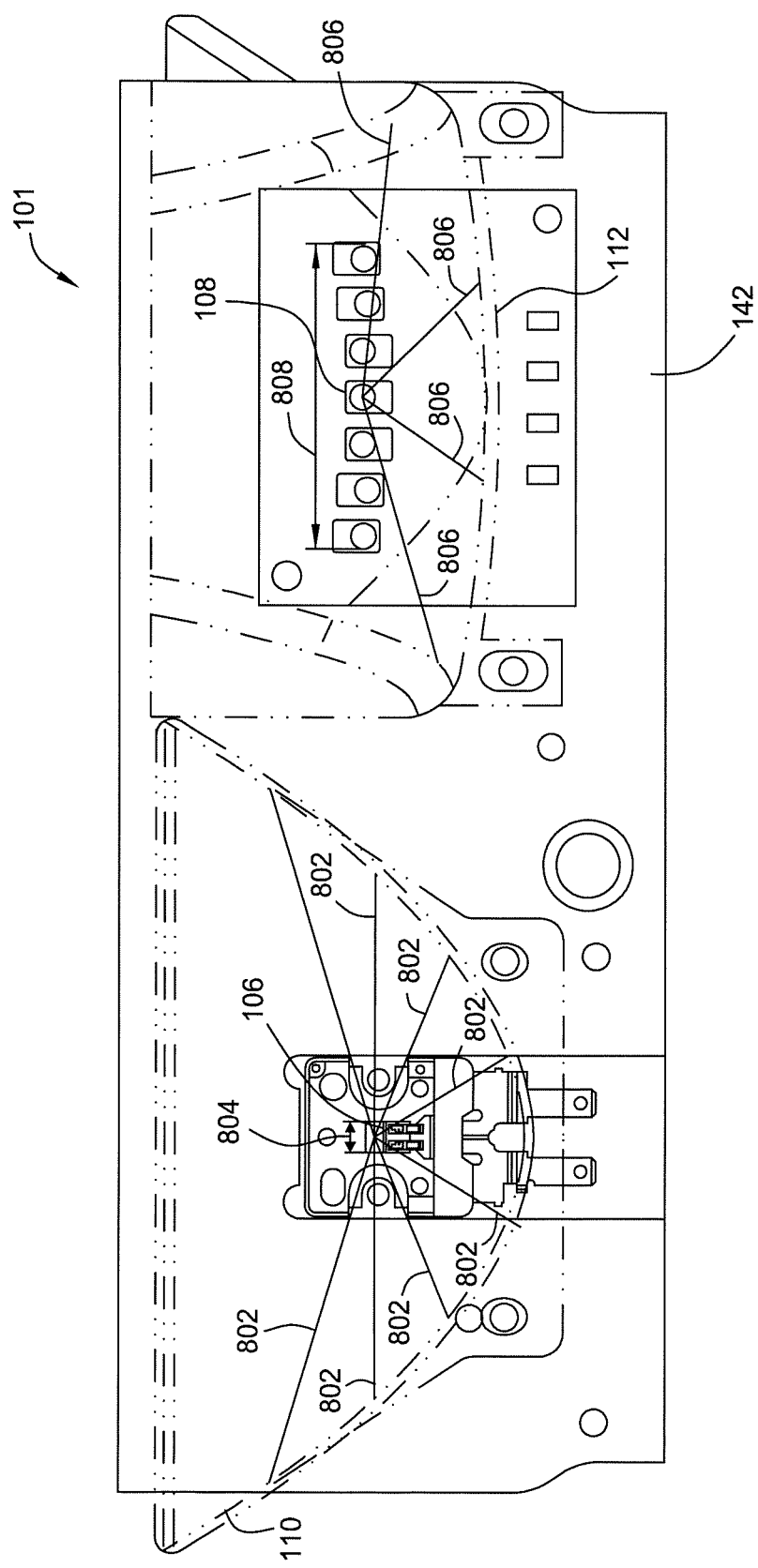
FIG. 8 depicts a top view of one embodiment of a light engine of the automotive headlight.
Figure 9:
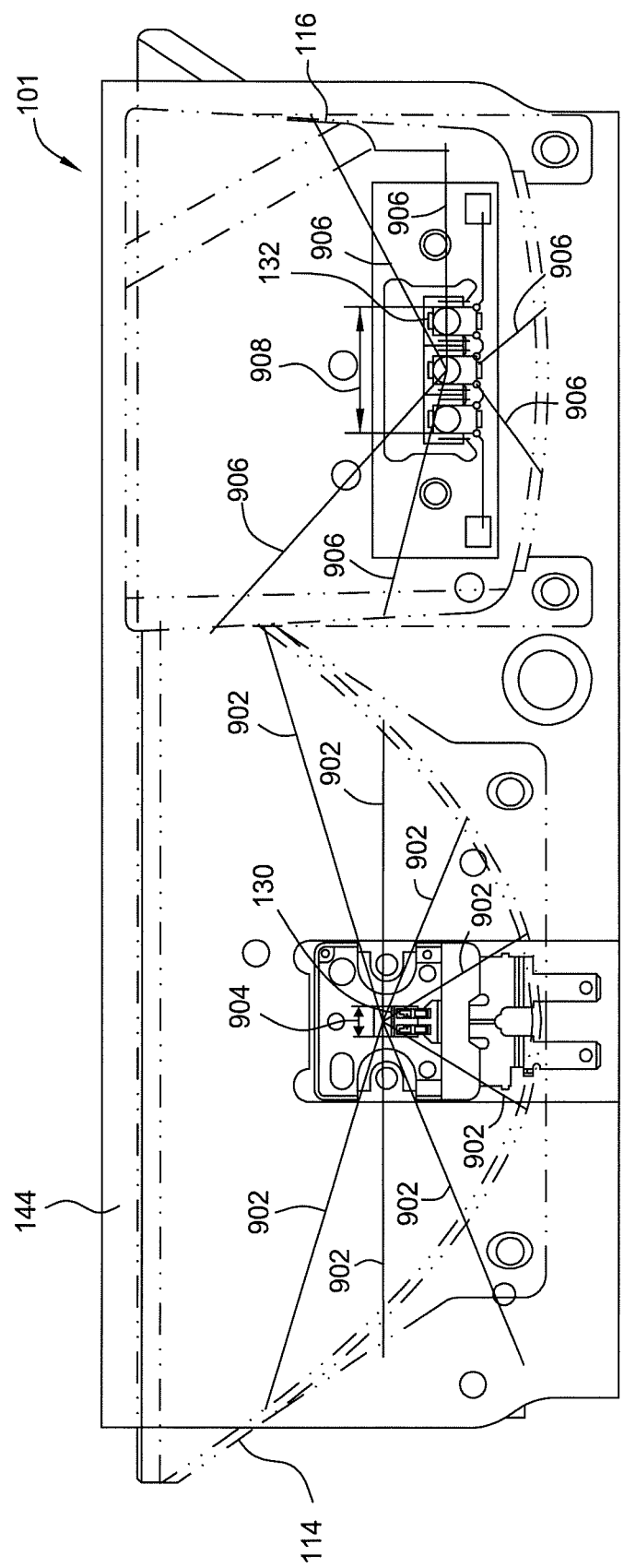
FIG. 9 depicts a bottom view of one embodiment of the light engine of the automotive headlight.

The relationship between the LED geometry and the reflector curvature strongly affects the beam pattern. For example the reflector curvature must be large with respect to the die size in order to achieve the collimation required on an automotive headlight. This can be described by the ratio of the average radius of curvature (ARC) of the reflector surface to the distance across the die (DAD). FIGS. 8 and 9 help to illustrate the ARC and the DAD.

FIG. 8 illustrates a top view of the LED assembly 101 with the LEDs 106 and 108. The reflectors 110 and 112 are illustrated in shadow by the dashed lines. FIG. 8 illustrates the radii 802 from a center of the LED 106 to the various edges of the reflector 110. The distance across the die for the LED 106 is illustrated by bracketed lines 804. Similarly, radii 806 from an approximate center of the LEDs 108 are also shown to the various edges of the reflector 112. The distance across the die for the LEDs 108 is illustrated by bracketed lines 808.

FIG. 9 illustrates a bottom view of the LED assembly 101 with the LEDs 130 and 132. The reflectors 114 and 116 are illustrated in shadow by the dashed lines. FIG. 9 illustrates the radii 902 from a center of the LED 130 to the various edges of the reflector 114. The distance across the die for the LED 130 is illustrated by bracketed lines 904. Similarly, radii 906 from an approximate center of the LEDs 132 are also shown to the various edges of the reflector 116. The distance across the die for the LEDs 132 is illustrated by bracketed lines 908. The radii 802, 806, 902 and 906 may be used to calculate the ARC for the respect reflectors.

An oval or oblong shaped beam pattern may be preferred for an automotive headlight so that the light is collimated more in the vertical axis than the horizontal axis. An oval or oblong shaped beam pattern may be created using different ARC/DAD relationships in the horizontal and vertical axes. The ARC to DAD ratio is even more critical for the reflectors that are used to create the hot-spots that aid in long range visibility. In one embodiment, the ARC/DAD of a hot-spot creating reflector in the horizontal axis is between (5.5) and (7.5). In one embodiment, the ARC/DAD in the vertical axis is between (4.5) and (6.5).

Figure 13:
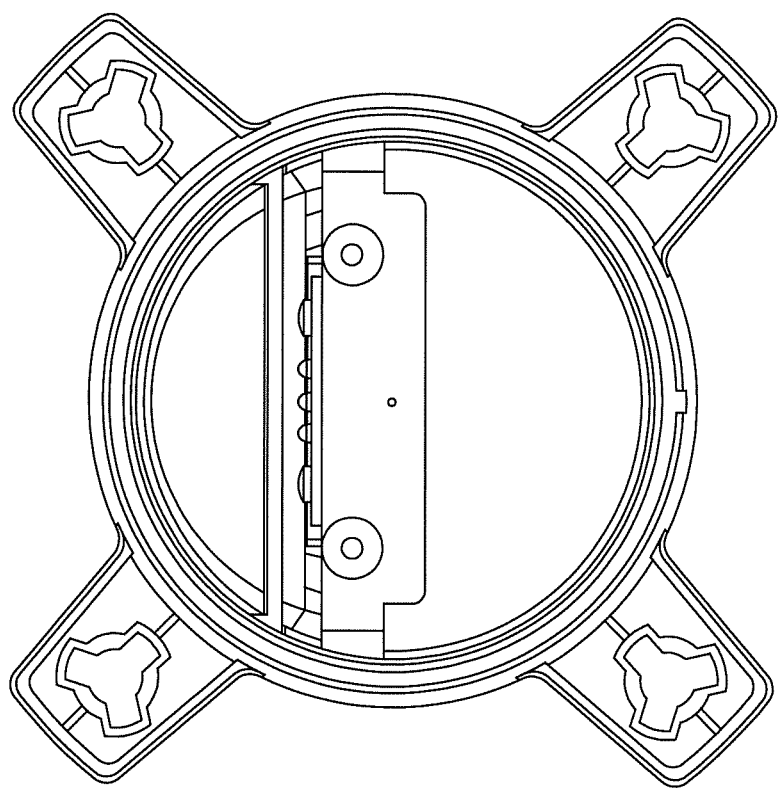
FIG. 13 depicts an automotive headlight front view for a 90 millimeter (mm) embodiment.
Figure 14:
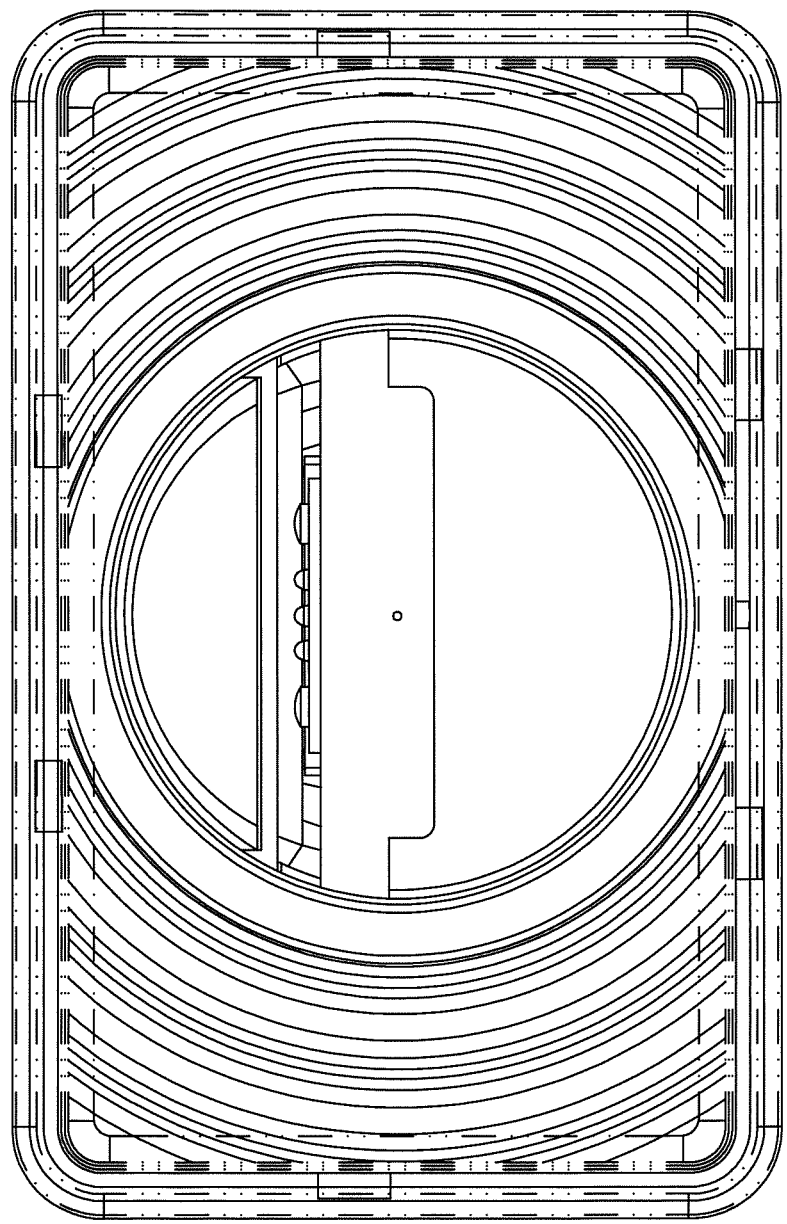
FIG. 14 depicts an automotive headlight front view for a 4 inch (in.)×6 in. embodiment.

The embodiments disclosed herein in can be used for other types of automotive headlight designs as well. For example, FIG. 13 illustrates an automotive headlight front view for a 90 millimeter (mm) embodiment. FIG. 14 illustrates an automotive headlight front view for a 4 inch (in)×6 in embodiment.

Figure 15:
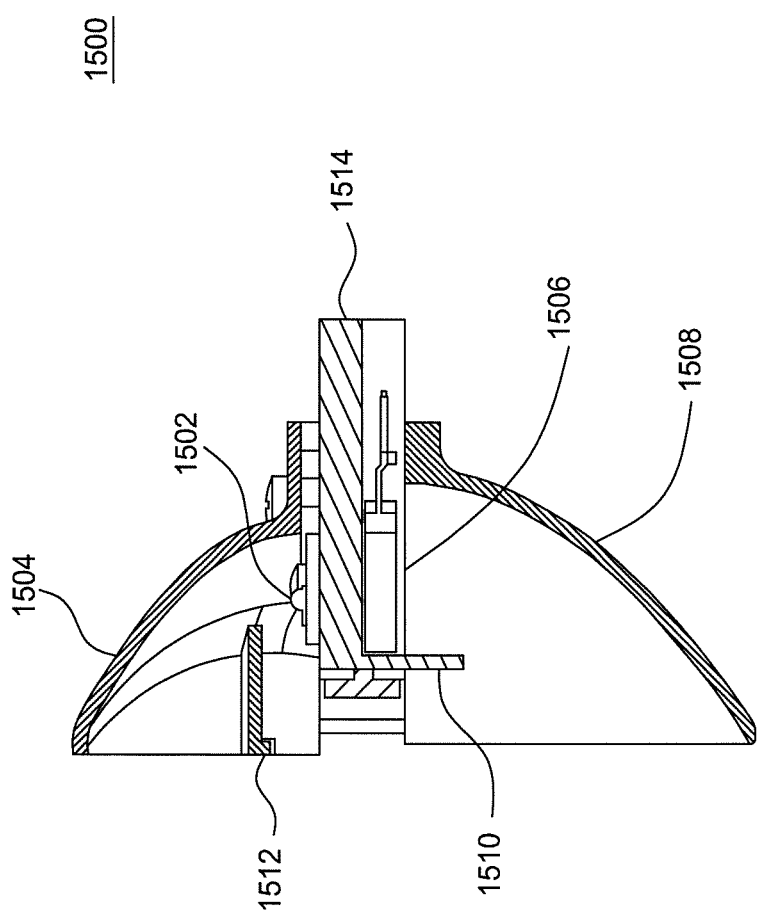
FIG. 15 depicts a cross-sectional side view of a light engine for either the 90 mm or 4 in.×6 in. embodiments.
Figure 16:
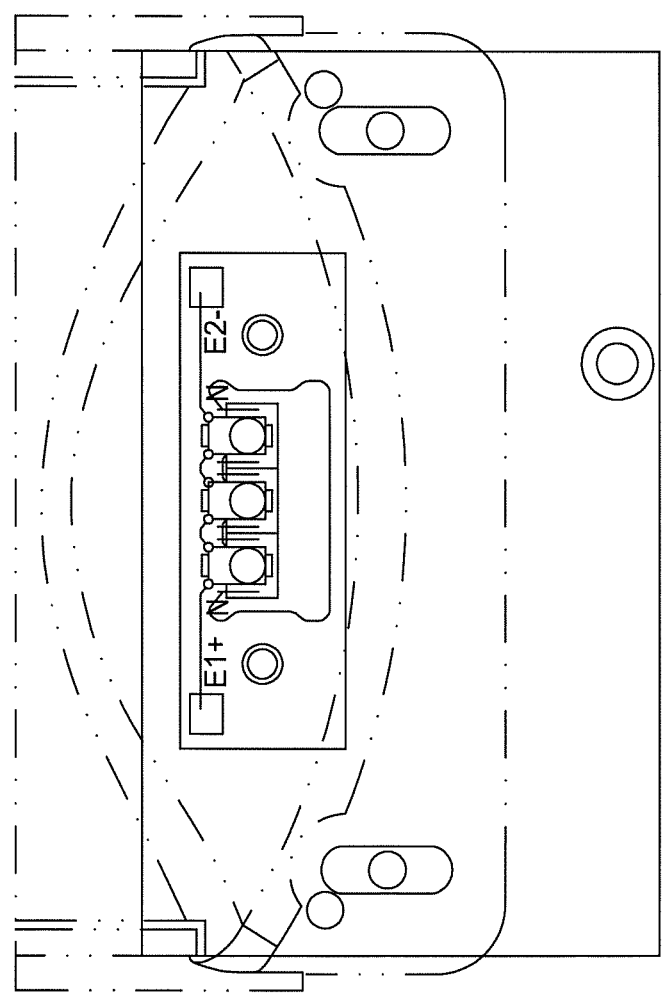
FIG. 16 depicts a top view of the light engine for either the 90 mm or 4 in.×6 in. embodiments.
Figure 17:
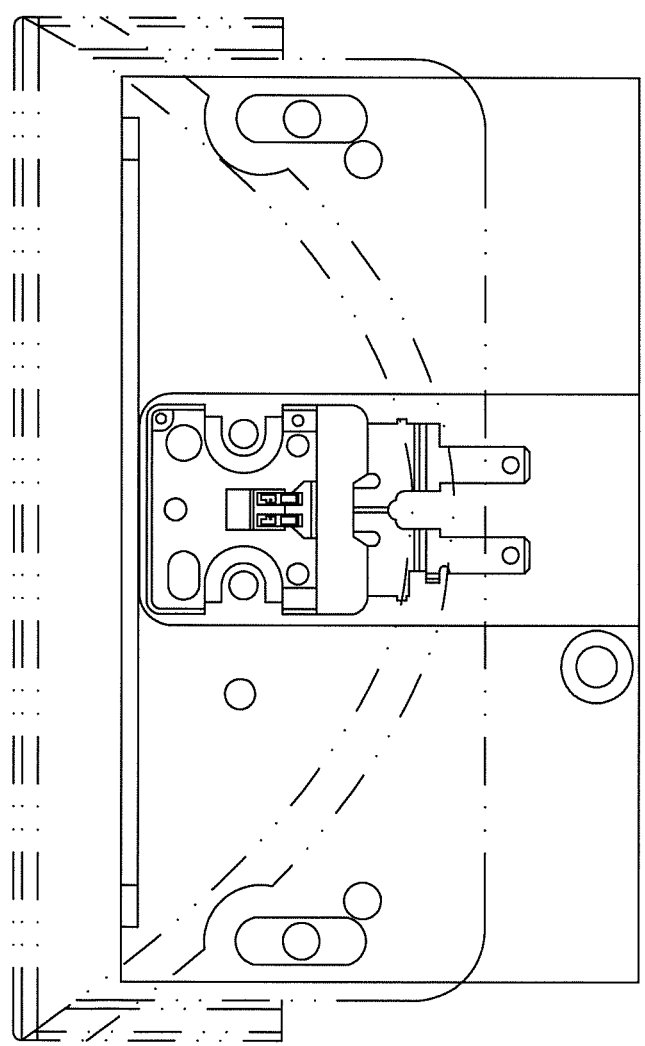
FIG. 17 depicts a bottom view of the light engine for either the 90 mm or 4 in.×6 in. embodiments.

FIG. 15 illustrates a cross-sectional side view of a light engine 1500 for either the 90 mm or 4 in.×6 in. embodiments. The light engine 1500 includes similar features to the LED assembly 101. For example, the light engine 1500 may include a support plate 1514. A one or more LEDs 1502 and 1506 may be coupled to the support plate. A first reflector 1504 may be associated with the LEDs 1502 and a second reflector 1508 may be associated with the LEDs 1506. The first reflector 1504 may have a complimentary reflector 1512 coupled to it. The support plate 1514 may include a light blocking piece 1510 to block light emitted from the LEDs 1506. FIGS. 16 and 17 illustrate a top view and a bottom view, respectively, of the light engine 1500.

While various embodiments have been described above, it should be understood that they have been presented by way of example only, and not limitation. Thus, the breadth and scope of a preferred embodiment should not be limited by any of the above-described embodiments, but should be defined only in accordance with the following claims and their equivalents.

What is claimed is:

1. A light source, comprising:
one or more first light emitting diodes (LEDs) comprising one or more low beam LEDs and one or more high beam LEDs;
one or more second LEDs comprising a second one or more high beam LEDs, wherein the one or more second LEDs are positioned on a same top side as the one or more first LEDs, wherein the one or more second LEDs are placed in a recess of the same top side of a support plate;
one or more third LEDs comprising one or more second low beam LEDs;
one or more fourth LEDs comprising one or more third low beam LEDs, wherein the one or more third LEDs and the one or more fourth LEDs are on a same bottom side as the one or more third LEDs, wherein the one or more third LEDs and the one or more fourth LEDs are positioned on an opposing side of the one or more first LEDs and the one or more second LEDs, wherein the one or more first LEDs, the one or more second LEDs, the one or more third LEDs and the one or more fourth LEDs each has a respective optical axis that is approximately perpendicular to a headlight optical axis;
a respective reflector for each one of the one or more first LEDs, the one or more second LEDs, the one or more third LEDs and the one or more fourth LEDs that redirect light from the one or more first LEDs, the one or more second LEDs, the one or more third LEDs and the one or more fourth LEDs in a direction of the headlight optical axis.

2. The light source of claim 1, wherein the respective reflector of the one or more first LEDs collimates light in a vertical direction.

3. The light source of claim 2, wherein the respective reflector of the one or more first LEDs comprises a complimentary reflector located inside of the respective reflector of the one or more first LEDs.

4. The light source of claim 3, wherein the complimentary reflector is substantially flat.

5. The light source of claim 3, wherein a light distribution out of the light source is changed by adjusting a position of the complimentary reflector at a time during a manufacturing process of the light source.

6. The light source of claim 5, wherein the position of the complimentary reflector is changed via slot in each sidewall of the respective reflector of the one or more first LEDs.

7. The light source of claim 5, wherein the position of the complimentary reflector is changed by tilting the complimentary reflector between 5 degrees and −5 degrees with respect a horizontal axis.

8. The light source of claim 3, wherein at least a portion of a bottom side of the complimentary reflector is metalized and reflects light emitted from at least one of the one or more first LEDs in a downward direction.

9. The light source of claim 3, wherein at least a portion of a top side of the complimentary reflector is metalized and reflects light emitted from at least one of the one or more first LEDs in an upward direction.

10. The light source of claim 3, wherein the complimentary reflector reflects at least some light from the one or more first LEDs that is emitted from the one or more first LEDs at an angle between −45 and −75 degrees with respect to the respective optical axis of the one or more first LEDs.

11. The light source of claim 10, wherein the complimentary reflector reflects at least some light emitted by the one or more first LEDs so that the reflected light is directed to angles between −135 and −165 degrees with respect to the optical axis of the one or more first LEDs.

12. The light source of claim 3, wherein the complimentary reflector functions using total internal reflection.

13. The light source of claim 1, wherein the respective reflector of the one or more second LEDs comprises a curved shape that is concave on two axes and collimates light in a vertical direction and a horizontal direction.

14. The light source of claim 1, wherein the respective reflector of the one or more third LEDs collimates light in a vertical direction.

15. The light source of claim 1, wherein the respective reflector of the one or more fourth LEDs comprises a curved shape that is concave on two axes and collimates light in a vertical direction and a horizontal direction.

16. The light source of claim 1, wherein the recess blocks light emitted at approximately −90 degrees with respect to the respective optical axis of the one or more second LEDs.

17. The light source of claim 1, wherein a peak intensity of the light redirected by the respective reflector of the each one of the one or more first LEDs, the one or more second LEDs, the one or more third LEDs and the one or more fourth LEDs is directed along the headlight optical axis to within +/−20 degrees.

18. The light source of claim 1, wherein the one or more fourth LEDs on the opposing side are approximately 180 degrees from the one or more first LEDs and have a tolerance of +/−20 degrees.

19. The light source of claim 1, wherein the one or more third LEDs on the opposing side are approximately 180 degrees from the one or more second LEDs and have a tolerance of +/−20 degrees.

20. The light source of claim 15, further comprising:
a housing; and
a light cover coupled to the housing, wherein a front edge of the support plate touches the light cover when enclosed by the housing and the light cover, wherein the front edge of the support plate transfers heat from the support plate to the light cover.

* * * * *